United States Patent
Cui et al.

(10) Patent No.: US 11,267,727 B2
(45) Date of Patent: Mar. 8, 2022

(54) WATER STERILIZATION DEVICES AND USES THEREOF

(71) Applicant: The Board of Trustees of the Leland Stanford Junior University, Palo Alto, CA (US)

(72) Inventors: Yi Cui, Stanford, CA (US); Chong Liu, Stanford, CA (US); Sangmoo Jeong, Stanford, CA (US); Alexandria Boehm, Stanford, CA (US)

(73) Assignee: THE BD OF TRUSTEES OF THE LELAND STANFORD JR UNIV, Stanford, CA (US)

( * ) Notice: Subject to any disclaimer, the term of this patent is extended or adjusted under 35 U.S.C. 154(b) by 804 days.

(21) Appl. No.: 14/390,009

(22) PCT Filed: Mar. 13, 2013

(86) PCT No.: PCT/US2013/030975
§ 371 (c)(1),
(2) Date: Oct. 1, 2014

(87) PCT Pub. No.: WO2013/151704
PCT Pub. Date: Oct. 10, 2013

(65) Prior Publication Data
US 2015/0075992 A1   Mar. 19, 2015

Related U.S. Application Data

(60) Provisional application No. 61/619,343, filed on Apr. 2, 2012.

(51) Int. Cl.
*C02F 1/46*    (2006.01)
*C02F 1/50*    (2006.01)
(Continued)

(52) U.S. Cl.
CPC ............... *C02F 1/46* (2013.01); *C02F 1/4608* (2013.01); *C02F 1/4695* (2013.01); *C02F 1/505* (2013.01);
(Continued)

(58) Field of Classification Search
CPC ................ C02F 2001/46157–46161; C02F 1/467–4676; C02F 1/50; C02F 1/46–4698
See application file for complete search history.

(56) References Cited

U.S. PATENT DOCUMENTS 3,725,226 A * 4/1973 Stoner ................ A61L 2/035
                                                    205/701
4,206,030 A * 6/1980 Santora .............. B03D 1/1437
                                                    204/242
(Continued)

FOREIGN PATENT DOCUMENTS

CN   1867392 A    11/2006
CN   101306854 A  11/2008
(Continued)

OTHER PUBLICATIONS

Schoen et al., High Speed Water Sterilization Using One-Dimensional Nanostructures, 10 Nano Letters 3628 (2010).*
(Continued)

*Primary Examiner* — Ho-Sung Chung
(74) *Attorney, Agent, or Firm* — Sheppard Mullin Richter & Hampton LLP

(57) ABSTRACT

A water sterilization device includes: (1) a conduit; (2) a first porous electrode housed in the conduit; (3) a second porous electrode housed in the conduit and disposed adjacent to the first porous electrode; and (4) an electrical source coupled to the first porous electrode and the second porous electrode to apply a voltage difference between the first porous electrode and the second porous electrode. The conduit is configured
(Continued)

to provide passage of a fluid stream through the first porous electrode and the second porous electrode, and an inactivation efficiency of pathogens in the fluid stream is at least about 99%, such as at least about 99.9% or at least about 99.95%.

15 Claims, 14 Drawing Sheets

(51) Int. Cl.
*C02F 1/469* (2006.01)
*C02F 1/461* (2006.01)

(52) U.S. Cl.
CPC .............. *C02F 2001/46161* (2013.01); *C02F 2201/46135* (2013.01); *C02F 2303/04* (2013.01); *C02F 2305/08* (2013.01); *C02F 2307/14* (2013.01)

(56) References Cited

U.S. PATENT DOCUMENTS

| | | | | |
|---|---|---|---|---|
| 5,897,757 | A * | 4/1999 | Sano .................. | C02F 1/46109 204/284 |
| 6,258,250 | B1 * | 7/2001 | Weissenbacher ..... | C02F 1/4602 205/341 |
| 6,328,875 | B1 * | 12/2001 | Zappi .................. | C02F 1/46104 204/275.1 |
| 7,736,776 | B1 * | 6/2010 | Spielman ............. | C02F 1/4618 210/748.01 |
| 2002/0132103 | A1 * | 9/2002 | Calarco ................ | C04B 14/024 428/304.4 |
| 2003/0075435 | A1 * | 4/2003 | Kemner ................ | C02F 1/4672 204/252 |
| 2004/0251215 | A1 * | 12/2004 | Bai ....................... | C02F 1/4608 210/748.17 |
| 2005/0224369 | A1 * | 10/2005 | Nyman ................. | C02F 1/4672 205/701 |
| 2005/0263456 | A1 | 12/2005 | Cooper et al. | |
| 2007/0034505 | A1 * | 2/2007 | Ikematsu ............. | C02F 1/46109 204/280 |
| 2007/0084797 | A1 * | 4/2007 | Cooper ................. | A61L 2/0082 210/660 |
| 2007/0108056 | A1 * | 5/2007 | Nyberg ................ | C02F 1/4695 204/554 |
| 2007/0246149 | A1 | 10/2007 | Millard et al. | |
| 2008/0283391 | A1 | 11/2008 | Ogawa et al. | |
| 2008/0283466 | A1 * | 11/2008 | Kepner ................. | A01N 59/16 210/501 |
| 2009/0294348 | A1 * | 12/2009 | Krogue ................ | B01D 39/12 210/266 |
| 2011/0259742 | A1 | 10/2011 | Li et al. | |
| 2011/0259747 | A1 * | 10/2011 | Cui ..................... | C02F 1/46109 204/554 |
| 2014/0231249 | A1 * | 8/2014 | Morimitsu ............. | C25C 7/02 204/290.09 |

FOREIGN PATENT DOCUMENTS

| | | | | |
|---|---|---|---|---|
| CN | 101351594 A | | 1/2009 | |
| CN | 101511453 A | | 8/2009 | |
| CN | 101563296 A | | 10/2009 | |
| CN | 101746849 A | | 6/2010 | |
| DE | 3014130 A1 | * | 10/1981 | .......... C02F 1/46114 |
| EP | 1995220 A1 | | 11/2008 | |
| JP | H07088474 A | * | 4/1995 | |
| JP | 10158863 A | * | 6/1998 | .............. F16L 58/02 |
| JP | 2005-254118 A | | 9/2005 | |
| JP | 2006-326403 A | | 12/2006 | |
| KR | 1020100027709 A | * | 3/2010 | .............. C02F 1/467 |
| WO | WO 01/27037 A1 | * | 4/2001 | ............ C02F 1/4618 |
| WO | WO-2004/080578 A1 | | 9/2004 | |
| WO | WO-2007/014109 A2 | | 12/2007 | |
| WO | WO-2011031239 A1 | * | 3/2011 | ............ C02F 1/4674 |

OTHER PUBLICATIONS

Lutz, English abstract and machine translation, DE 30 14 130 A1 (1981).*
Nakayama et al., English Machine Translation JP H10-158863 A(Year: 1998).*
Kim, Machine Translation, KR 1020100027709 A (Year: 2010).*
Hashimoto et al., Machine Translation, JP H07-088474 A (Year: 1995).*
Second Office Action and Supplementary Search Report for Chinese Application No. 201380025335.2 dated Aug. 19, 2016, 7 pages.
International Search Report and Written Opinion for PCT /US2013/ 030975, dated Jun. 21, 2013, 7 pages.
First Office Action on CN Application No. 201380025335 dated Jan. 26, 2016, 17 pages (English Translation).
Fourth Office Action on CN Application No. 201380025335.2 dated Sep. 22, 2017, 7 pages (English Translation).
International Preliminary Report on Patentability for International Application No. PCT/US2013/030975 dated Oct. 16, 2014, 7 pages.
Rejection Decision on CN Application No. 201380025335.2 dated Apr. 3, 2018, 16 pages (English Translation).
Third Office Action on CN Application No. 201380025335.2 dated Jan. 26, 2017, 9 pages (English Translation).
Xiao, "Basic Knowledge of Mechanical Manufacturing", Henan Science and Technology Press, Sep. 30, 2006, p. 161.
English translation of First Office Action for CN Application No. 201810789452.0 dated Dec. 24, 2020, 8 pages.

* cited by examiner

WATER STERILIZATION DEVICES AND USES THEREOF

CROSS REFERENCE TO RELATED APPLICATION

This application is a National Stage Entry of PCT/US2013/030975 filed on Mar. 13, 2013, which claims the benefit of U.S. Provisional Application No. 61/619,343 filed on Apr. 2, 2012, the disclosure of which is incorporated herein by reference in its entirety.

FIELD OF THE INVENTION

The invention relates generally to sterilization of fluids. More particularly, the invention relates to water sterilization devices and uses thereof.

BACKGROUND

The removal of bacteria and other pathogens from water is an important process, not only for drinking and sanitation but also industrially as biofouling is a commonplace and serious problem. Conventional approaches for water sterilization include chlorination and membrane-based approaches. Unfortunately, both of these types of approaches suffer from certain deficiencies.

Chlorination is typically a slow process, involving incubation times up to an hour or more to allow Cl⁻ ions to adequately dissipate through water to be treated. Also, chlorination can yield hazardous oxidation byproducts, including carcinogenic species, and chlorination equipment can be capital intensive, both from the standpoint of deployment and maintenance.

Conventional membrane-based approaches typically operate based on size exclusion of bacteria, which can involve a high pressure drop across a membrane and clogging of the membrane. Moreover, conventional membrane-based approaches can be energy intensive, and can suffer from low flow rates across a membrane.

It is against this background that a need arose to develop the water sterilization devices and related methods and systems described herein.

SUMMARY

One aspect of the invention relates to a water sterilization device. In one embodiment, the device includes: (1) a conduit; (2) a first porous electrode housed in the conduit; (3) a second porous electrode housed in the conduit and disposed adjacent to the first porous electrode; and (4) an electrical source coupled to the first porous electrode and the second porous electrode to apply a voltage difference between the first porous electrode and the second porous electrode. The conduit is configured to provide passage of a fluid stream through the first porous electrode and the second porous electrode, and an inactivation efficiency of pathogens in the fluid stream is at least about 99%, such as at least about 99.9% or at least about 99.95%.

In another embodiment, the device includes: (1) a conduit including an inlet to provide entry of untreated water and an outlet to provide exit of treated water; (2) a porous electrode housed in the conduit and disposed between the inlet and the outlet, the porous electrode including an electrically conductive mesh and a coating at least partially covering the electrically conductive mesh; and (3) an electrical source coupled to the porous electrode.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Definitions

Figure 1:
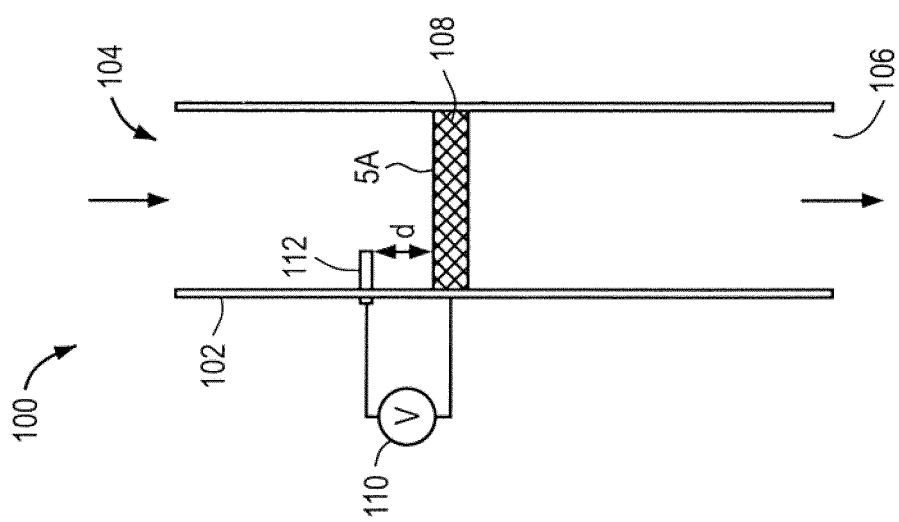
FIG. 1 illustrates a water sterilization device implemented in accordance with an embodiment of the invention.

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common characteristics.

As used herein, the term "adjacent" refers to being near or adjoining Adjacent objects can be spaced apart from one another or can be in actual or direct contact with one another. In some instances, adjacent objects can be coupled to one another or can be formed integrally with one another.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "expose," "exposing," and "exposed" refer to a particular object being subject to some level of interaction with another object. A particular object can be exposed to another object without the two objects being in actual or direct contact with one another. Also, a particular object can be exposed to another object via indirect interaction between the two objects, such as via an intermediary set of objects.

As used herein, the term "nanometer range" or "nm range" refers to a range of dimensions from about 1 nm to about 1 μm. The nm range includes the "lower nm range," which refers to a range of dimensions from about 1 nm to about 10 nm, the "middle nm range," which refers to a range of dimensions from about 10 nm to about 100 nm, and the "upper nm range," which refers to a range of dimensions from about 100 nm to about 1 μm.

As used herein, the term "micrometer range" or "μm range" refers to a range of dimensions from about 1 μm to about 1 mm. The μm range includes the "lower μm range," which refers to a range of dimensions from about 1 μm to about 10 μm, the "middle μm range," which refers to a range of dimensions from about 10 μm to about 100 μm, and the "upper μm range," which refers to a range of dimensions from about 100 μm to about 1 mm.

As used herein, the term "aspect ratio" refers to a ratio of a largest dimension or extent of an object and an average of remaining dimensions or extents of the object, where the remaining dimensions are orthogonal with respect to one another and with respect to the largest dimension. In some instances, remaining dimensions of an object can be substantially the same, and an average of the remaining dimensions can substantially correspond to either of the remaining dimensions. For example, an aspect ratio of a cylinder refers to a ratio of a length of the cylinder and a cross-sectional diameter of the cylinder. As another example, an aspect ratio of a spheroid refers to a ratio of a major axis of the spheroid and a minor axis of the spheroid.

As used herein, the term "nanostructure" refers to an object that has at least one dimension in the nm range. A nanostructure can have any of a wide variety of shapes, and can be formed of a wide variety of materials. Examples of nanostructures include nanowires, nanotubes, and nanoparticles.

As used herein, the term "nanowire" refers to an elongated nanostructure that is substantially solid. Typically, a nanowire has a lateral dimension (e.g., a cross-sectional dimension in the form of a width, a diameter, or a width or diameter that represents an average across orthogonal directions) in the nm range, a longitudinal dimension (e.g., a length) in the μm range, and an aspect ratio that is about 5 or greater.

As used herein, the term "nanotube" refers to an elongated, hollow nanostructure. Typically, a nanotube has a lateral dimension (e.g., a cross-sectional dimension in the form of a width, an outer diameter, or a width or outer diameter that represents an average across orthogonal directions) in the nm range, a longitudinal dimension (e.g., a length) in the μm range, and an aspect ratio that is about 5 or greater.

As used herein, the term "nanoparticle" refers to a spheroidal nanostructure. Typically, each dimension (e.g., a cross-sectional dimension in the form of a width, a diameter, or a width or diameter that represents an average across orthogonal directions) of a nanoparticle is in the nm range, and the nanoparticle has an aspect ratio that is less than about 5, such as about 1.

Water Sterilization Devices

Embodiments of the invention relate to the sterilization of water or other fluids using a porous structure that can effectively inactivate bacteria, viruses, protozoa, and other undesired organisms. Certain embodiments incorporate nanostructures in a porous support to yield an electrically conductive and high surface area structure for the active, high-throughput inactivation of pathogens in water. Other embodiments incorporate coatings or films in a porous support to yield similar or further improved performance. Notably, unlike conventional membrane-based approaches, a porous structure described herein need not rely on size exclusion of pathogens, which can involve a high pressure drop and can lead to clogging, but instead combines components spanning multiple length scales into a framework that inactivates bacteria passing through the porous structure. In some embodiments, the use of such a porous structure leads to a gravity-fed, biofouling-resistant device that can inactivate pathogens at faster flow rates than conventional membrane-based approaches while consuming less energy. In addition, such improved performance can be achieved with short incubation times and without requiring the use of chemical additives as in chlorination.

As noted above, one component of a porous structure is a porous support, which can be characterized in terms of its material composition, its pore size, and its porosity. Depending on the particular implementation, a porous support can be formed of a material that is insulating, electrically conductive, or semiconducting, or can be formed of a combination of materials having a combination of characteristics. In some embodiments, a porous support includes a fibrous material, namely one including a matrix or a network of fibers that can be woven or unwoven. Examples of fibrous materials include paper, wood, and textiles, including those formed of natural fibers, such as cotton, flax, and hemp, and those formed of synthetic fibers, such as acrylic, polyester, rayon, as well as carbon fiber in the form of a carbon cloth. Other types of porous supports are contemplated, such as permeable or semi-permeable membranes, foams, sponges, and meshes formed of metals or other electrically conductive materials. Examples of sponges include those formed of cellulose, polyurethane, polyether, polyester, polyvinyl alcohol, and other foamed polymers, and examples of meshes include those formed of aluminum, copper, nickel, and stainless steel.

A pore size of a porous support can be selected based on a typical size of pathogens to be inactivated. For example, in the case of bacteria, a pore size can be selected to be greater than a typical size of bacteria to be inactivated, thereby allowing passage of bacteria with little or no clogging of a porous support. In some embodiments, a porous support can include pores that are sufficiently sized in the μm range, such as at least about 5 μm or at least about 10 μm and up to about 1 cm or up to about 1 mm, and, more particularly, a pore size can be in the range of about 5 μm to about 1 mm, about 5 μm to about 900 μm, about 10 μm to about 800 μm, about 10 μm to about 700 μm, about 10 μm to about 600 μm, about 100 μm to about 600 μm, about 200 μm to about 600 μm, about 300 μm to about 600 μm, about 10 μm to about 500 μm, about 100 μm to about 500 μm, about 200 μm to about 500 μm, about 300 μm to about 500 μm, about 10 μm to about 400 μm, about 20 μm to about 400 μm, about 30 μm to about 300 μm, about 40 μm to about 300 μm, about 50 μm to about 300 μm, or about 50 μm to about 200 μm. In the case of other types of pathogens, a pore size can be suitably selected in accordance with a typical size of those pathogens. For example, in the case of viruses, a pore size can be selected to be in the nm range, such as at least about 100 nm and up to about 1 μm. There can be a tradeoff between water filtration speed and pore sizes. In some embodiments, a porous support can include pores that are sized in the μm range, such as at least about 2 μm or at least about 5 μm and up to about 100 μm or up to about 1 mm. As can be appreciated, pores of a porous support can have a distribution of sizes, and a pore size can refer to an effective size across the distribution of sizes or an average or median of the distribution of sizes. The use of a sponge, a mesh, or other porous support including pores that are sufficiently and uniformly sized can mitigate against clogging and biofouling of the porous support. In some embodiments, a standard deviation of a distribution of pore sizes can be no greater than about 80% of an average of the distribution of sizes, such as no greater than about 70%, no greater than about 60%, no greater than about 50%, no greater than about 40%, no greater than about 30%, no greater than about 20%, and down to about 10%, down to about 5%, or less. An example of a technique for determining pore size is the so-called "challenge test," in which spheroidal particles of known size distributions are presented to a porous support and changes downstream are measured by a particle size analyzer. Using the challenge test, a pore size can be determined from a calibration graph, with the pore size corresponding to an effective cut-off point of the porous support. In some implementations, this cut-off point can correspond to a maximum size of a spheroidal particle that can pass through substantially unblocked by the porous support.

Another characterization of a porous support is its porosity, which is a measure of the extent of voids resulting from the presence of pores or any other open spaces in the porous support. A porosity can be represented as a ratio of a volume of voids relative to a total volume, namely between 0 and 1, or as a percentage between 0% and 100%. In some embodiments, a porous support can have a porosity that is at least about 0.05 or at least about 0.1 and up to about 0.95, and, more particularly, a porosity can be in the range of about 0.1 to about 0.9, about 0.2 to about 0.9, about 0.3 to about 0.9, about 0.4 to about 0.9, about 0.5 to about 0.9, about 0.5 to about 0.8, or about 0.6 to about 0.8. Techniques for determining porosity include, for example, porosimetry and optical or scanning techniques. The incorporation of nanostructures or other components in a porous support can be carried out so as to substantially retain an original pore size and an original porosity of the porous support, and, therefore, the ranges and other characteristics related to a pore size and a porosity specified above are also applicable for a resulting porous structure.

As noted above, other components can be incorporated in a porous support to impart desired functionality to a resulting porous structure, and, in some embodiments, such other components correspond to nanostructures. Depending on the particular implementation, a single type of nanostructure can be incorporated, or two or more different types of nanostructures can be incorporated to impart a combination of functionalities.

A nanostructure can be characterized in terms of its material composition, its shape, and its size. Depending on the particular implementation, a nanostructure can be formed of a material that is insulating, electrically conductive, or semiconducting, or can be a heterostructure formed of a combination of materials having a combination of characteristics, such as in a core-shell or multi-layered configuration. Techniques for forming nanostructures include, for example, attrition, spray pyrolysis, vapor phase growth, vapor-liquid-solid growth, colloidal synthesis, electrospinning, hot injection, laser ablation, and solution-based synthesis. In some embodiments, a porous structure provides sterilization via an electrical mechanism, with a high surface area of a porous support and nanostructures along with an induced electric field in the vicinity of the nanostructures providing effective bacterial inactivation. In the case that the porous support is insulating, at least a subset of the nanostructures can be electrically conductive or semiconducting to impart electrical conductivity to the porous structure. For example, a nanostructure can be formed of a metal, a metal alloy, a metal silicide, a metal nitride, a metal sulfide, a metal carbide, a semiconductor, an electrically conductive polymer, a doped form of a metal oxide, or a combination of such materials, and, more particularly, a nanostructure can be formed of copper, gold, nickel, palladium, platinum, silver, zinc, aluminum, titanium, iron, carbon (e.g., in the form of graphene or nanotube) or another Group IVB element (e.g., silicon or germanium), a Group IVB-IVB binary alloy (e.g., silicon carbide), a Group IIB-VIB binary alloy (e.g., zinc oxide), a Group IIIB-VB binary alloy (e.g., aluminum nitride), or another binary, ternary, quaternary, or higher order alloy of Group IB (or Group 11) elements, Group IIB (or Group 12) elements, Group IIIB (or Group 13) elements, Group IVB (or Group 14) elements, Group VB (or Group 15) elements, Group VIB (or Group 16) elements, and Group VIIB (or Group 17) elements. In the case that a porous support is electrically conductive, nanostructures that are electrically conductive or semiconducting optionally can be omitted.

In addition to, or in place of, sterilization via an electrical mechanism, sterilization can be achieved through the use of a material having an intrinsic activity towards inactivating bacteria, viruses, or other pathogens. For example, at least a subset of incorporated nanostructures can be formed of a material or a combination of materials having intrinsic antimicrobial activity, such as silver (or another noble metal), copper, nickel, or another bactericidal material. The use of nanostructures formed of a metal such as silver can serve a dual purpose of imparting an electrical conduction functionality as well as a bactericidal functionality to a resulting porous structure.

A nanostructure can have any of a variety of shapes, such as spheroidal, tetrahedral, tripodal, disk-shaped, pyramid-shaped, box-shaped, cube-shaped, cylindrical, tubular, wire-shaped, branch-shaped, and a number of other geometric and non-geometric shapes. Examples of nanostructures include fullerenes, copper nanowires, nickel nanowires, silver nanowires, germanium nanowires, silicon nanowires, silicide nanowires, metal oxide nanowires (e.g., zinc oxide nanowires, copper oxide nanowires, and iron oxide nanowires), metal carbide nanowires, carbon nanotubes (e.g., single-walled carbon nanotubes and multi-walled carbon nanotubes), and core-shell nanowires (e.g., a shell formed of copper, nickel, or silver surrounding a core formed of another material). In some embodiments, at least a subset of incorporated nanostructures corresponds to high aspect ratio nanostructures, such as nanotubes, nanowires, or a combination of nanotubes and nanowires. High aspect ratio nanostructures can have large surface areas for stronger and direct coupling to a framework of a porous support, without requiring chemical strategies to provide such coupling. In addition, the use of high aspect ratio nanostructures can increase the occurrence of junction formation between neighboring nanostructures, and can form an efficient charge transport network by reducing the number of hopping or tunneling events, relative to the use of nanoparticles. However, it is contemplated that nanoparticles can be used in combination with, or in place of, high aspect ratio nanostructures.

For example, a porous structure can include nanowires, such as silver nanowires, having an average or median diameter in the range of about 1 nm to about 200 nm, about 1 nm to about 150 nm, about 10 nm to about 100 nm, about 20 nm to about 100 nm, about 30 nm to about 100 nm, or about 40 nm to about 100 nm, an average or median length in the range of about 500 nm to about 100 µm, about 800 nm to about 50 µm, about 1 µm to about 40 µm, about 1 µm to 30 µm, about 1 µm to about 20 µm, or about 1 µm to about 10 µm, and an average or median aspect ratio in the range of about 5 to about 2,000, about 50 to about 1,000, about 100 to about 900, about 100 to about 800, about 100 to about 700, about 100 to about 600, or about 100 to about 500.

As another example, a porous structure can include nanotubes, such as carbon nanotubes, having an average or median diameter (e.g., outer diameter) in the range of about 1 nm to about 200 nm, about 1 nm to about 150 nm, about 10 nm to about 100 nm, about 20 nm to about 100 nm, about 30 nm to about 100 nm, or about 40 nm to about 100 nm, an average or median length in the range of about 500 nm to about 100 µm, about 800 nm to about 50 µm, about 1 µm to about 40 µm, about 1 µm to 30 µm, about 1 µm to about 20 µm, or about 1 µm to about 10 µm, and an average or median aspect ratio in the range of about 5 to about 2,000, about 50 to about 1,000, about 100 to about 900, about 100 to about 800, about 100 to about 700, about 100 to about 600, or about 100 to about 500.

Incorporation of nanostructures in a porous support can be carried out in a variety of ways. For example, nanostructures can be formed and then dispersed in an aqueous solution or a non-aqueous solution to form an ink. Surfactants, dispersants, and other additives to adjust rheology also can be included. Next, the ink including the dispersed nanostructures can be applied to a porous support using any of a number of coating techniques, such as spraying, printing, roll coating, curtain coating, gravure coating, slot-die, cup coating, blade coating, immersion, dip coating, and pipetting, followed by drying or other removal of the solution. It is also contemplated that nanostructures can be formed in situ on a porous support, such as by exposing surfaces of the porous support to a precursor solution. It is further contemplated that nanostructures can be applied to a porous support in the form of a paste.

Coupling between nanostructures and a porous support can rely on mechanical entanglement of the nanostructures within pores of the porous support, adhesion characteristics of an ink relative to a framework of the porous support, surface charges of the framework, functional groups of the framework, or a combination of these mechanisms. In some embodiments, coupling between nanostructures and a porous support can involve the formation of chemical bonds, including covalent bonds and non-covalent bonds, such as van der Waals interactions, hydrogen bonds, bonds based on hydrophobic forces, bonds based on π-π interactions, and bonds based on electrostatic interactions (e.g., between cations and anions or dipole-dipole interactions). It is contemplated that nanostructures can be functionalized or otherwise treated to promote the formation of chemical bonds.

In addition to, or in place of, nanostructures, a set of coatings or films can be incorporated in a porous support to impart desired functionality to a resulting porous structure. Depending on the particular implementation, a single coating can be incorporated, or two or more coatings can be incorporated to impart a combination of functionalities.

A coating can be characterized in terms of its material composition and its thickness. Depending on the particular implementation, a coating can be formed of a material that is insulating, electrically conductive, or semiconducting, or can be formed of a combination of materials having a combination of characteristics. Techniques for applying a coating include, for example, chemical deposition (e.g., plating, chemical solution deposition (or sol-gel deposition), and chemical vapor deposition (such as plasma enhanced chemical vapor deposition)), physical deposition (e.g., thermal evaporation, sputtering, pulsed laser deposition, cathodic arc deposition, and electrospray deposition), atomic layer deposition, reactive sputtering, and molecular beam epitaxy. In some embodiments, sterilization occurs via an electrical mechanism, and, in the case that a porous support is insulating, at least one coating can be electrically conductive or semiconducting to impart electrical conductivity to a resulting porous structure. For example, a coating can be formed of a metal, a metal alloy, a metal silicide, a semiconductor, an electrically conductive polymer, a doped form of a metal oxide, or a combination of such materials, and, more particularly, a coating can be formed of materials as listed above for the case of nanostructures.

In some embodiments in which sterilization occurs via an electrical mechanism, at least one coating can be insulating to provide a barrier function. Such an insulating coating can be conformally disposed to substantially cover an active surface of a porous support, thereby allowing a separator to be omitted between the coated porous support and an adjacent electrode. In addition, such an insulating coating can impede current leakage towards (or from) the adjacent electrode that can otherwise dissipate power and reduce inactivation efficiency towards pathogens. By mitigating power dissipation, a desired inactivation efficiency can be achieved with reduced power and energy requirements. For example, a coating can be formed of a dielectric material, a ceramic, or a combination of such materials, and, more particularly, a coating can be formed of a metal oxide (e.g., zinc oxide (or ZnO), aluminum oxide (or $Al_2O_3$), or zirconium oxide (or $ZrO_2$)), a nonmetal oxide (e.g., silicon dioxide (or $SiO_2$)), a carbide, a boride, a nitride, or a silicide.

A thickness of a coating can be selected based on balancing a combination of considerations, such as providing a barrier function while retaining an adequate electric field and retaining ease and low cost of manufacturing. In some embodiments, a thickness of a coating can be in the nm range or the μm range, such as at least about 3 nm or at least about 10 nm and up to about 100 μm or up to about 10 μm, and, more particularly, a coating thickness can be in the range of about 3 nm to about 10 μm, about 10 nm to about 10 μm, about 100 nm to about 10 μm, about 200 nm to about 10 μm, about 300 nm to about 10 μm, about 400 nm to about 10 μm, about 500 nm to about 10 μm, about 500 nm to about 5 μm, about 600 nm to about 5 μm, about 700 nm to about 5 μm, about 800 nm to about 5 μm, about 900 nm to about 5 μm, or about 900 nm to about 3 μm. As can be appreciated, a coating can have a distribution of thickness across a porous structure, and a thickness of the coating can refer to an effective thickness across the porous structure or an average or median of the distribution of thickness. An example of a technique for determining a thickness of a coating involves visual inspection of cross-sectional samples at one or more locations across a porous structure. Another example of a technique for determining a thickness of a coating involves correlating or estimating the thickness based on a corresponding thickness of a coating when applied to a reference wafer or another reference substrate under the same processing conditions.

In embodiments in which sterilization is achieved via an electrical mechanism, a porous structure can have a sheet resistance that is no greater than about 1,000 Ω/sq, no greater than about 500 Ω/sq, no greater than about 400 Ω/sq, no greater than about 300 Ω/sq, no greater than about 200 Ω/sq, no greater than about 100 Ω/sq, no greater than about 50 Ω/sq, no greater than about 25 Ω/sq, or no greater than about 10 Ω/sq, and down to about 1 Ω/sq, down to about 0.1 Ω/sq, or less. Another characterization of a porous structure is its resistivity, which in some embodiments is no greater than about 1,000 Ω·cm, no greater than about 500 Ω·cm, no greater than about 400 Ω·cm, no greater than about 300 Ω·cm, no greater than about 200 Ω·cm, no greater than about 100 Ω·cm, no greater than about 50 Ω·cm, no greater than about 25 Ω·cm, or no greater than about 10 Ω·cm, and down to about 1 Ω·cm, down to about 0.1 Ω·cm, or less.

Attention turns to FIG. 1, which illustrates a water sterilization device 100 implemented in accordance with an embodiment of the invention. The device 100 includes a conduit 102 that provides a passageway for a fluid stream to be treated. In the illustrated embodiment, the fluid stream is a stream of water to be sterilized, and the conduit 102 includes an inlet 104, which allows entry of untreated water, and an outlet 106, which allows exit of treated water.

The device 100 also includes a porous structure 108, which is housed in the conduit 102 and is disposed between the inlet 104 and the outlet 106. During operation of the device 100, a stream of water passes through the porous structure 108 and is sterilized upon passing through pores of the porous structure 108. Although the single porous structure 108 is illustrated in FIG. 1, it is contemplated that multiple porous structures can be included to provide multi-staged, serial sterilization of a fluid stream.

In the illustrated embodiment, sterilization is at least partially achieved via an electrical mechanism, with the porous structure 108 serving as a porous electrode. Specifically, the device 100 further includes a counter electrode 112 and an electrical source 110, which is coupled to the porous structure 108 and the counter electrode 112. The counter electrode 112 is housed in the conduit 102 and is spaced apart from the porous structure 108 by a distance d, which can be at least about 1 µm, at least about 5 µm, or at least about 10 µm, and up to about 100 µm, up to about 200 µm, up to about 500 µm, up to about 1 cm, or up to about 10 cm. The electrical source 110 can be implemented as a voltage source that applies a voltage difference between the porous structure 108 and the counter electrode 112, such as a voltage difference in the range of about −100 V to about +100 V (e.g., about −100 V to about 0 V or about 0 V to about +100 V), about −80 V to about +80 V (e.g., about −80 V to about 0 V or about 0 V to about +80 V), about −50 V to about +50 V (e.g., about −50 V to about 0 V or about 0 V to about +50 V), about −30 V to about +30 V (e.g., about −30 V to about 0 V or about 0 V to about +30 V), about −20 V to about +20 V (e.g., about −20 V to about 0 V or about 0 V to about +20 V), about −10 V to about +10 V (e.g., about −10 V to about 0 V or about 0 V to about +10 V), about −5 V to about +5 V (e.g., about −5 V to about 0 V or about 0 V to about +5 V), about −2 V to about +2 V (e.g., about −2 V to about 0 V or about 0 V to about +2 V), about −1 V to about +1 V (e.g., about −1 V to about 0 V or about 0 V to about +1 V), about −0.5 V to about +0.5 V (e.g., about −0.5 V to about 0 V or about 0 V to about +0.5 V), about −0.2 V to about +0.2 V (e.g., about −0.2 V to about 0 V or about 0 V to about +0.2 V), or about −0.1 V to about +0.1 V (e.g., about −0.1 V to about 0 V or about 0 V to about +0.1 V). The application of a voltage induces an electric field in the vicinity of the porous structure 108, and a stream of water is at least partially sterilized as it passes through the porous structure 108 and is subjected to the electric field, which can be in the range of about 10 V/m to about $10^{12}$ V/m, about $10^2$ V/m to about $10^{11}$ V/m, about $10^3$ V/m to about $10^{10}$ V/m, about $10^3$ V/m to about $10^9$ V/m, about $10^4$ V/m to about $10^9$ V/m, about $10^4$ V/m to about $10^8$ V/m, about $10^5$ V/m to about $10^8$ V/m, about $10^5$ V/m to about $10^7$ V/m, or about $10^5$ V/m to about $10^6$ V/m.

As illustrated in FIG. 1, the porous structure 108 includes multiple components spanning multiple length scales to provide a combination of functionalities. A porous support serves as a backbone of the porous structure 108. For example, the porous support can be a sponge, which has a number of desirable characteristics including a high surface to volume ratio, a substantially continuous framework, and a high porosity. Pores of the sponge can be in the range of tens to hundreds of micrometers, which are larger than a typical size of bacteria and other pathogens to avoid or reduce clogging during operation.

Another component of the porous structure 108 corresponds to nanotubes, such as carbon nanotubes. The nanotubes are conformally coated onto the porous support to impart electrical conductivity over most, or all, of an active surface area of the porous structure 108. In such manner, the porous structure 108 can be placed at a controlled electric potential and used in solution as a porous electrode. The interconnected configuration of the nanotubes also can contribute towards electrical conductivity of the porous structure 108.

A further component of the porous structure 108 corresponds to nanowires, such as silver nanowires with an average or median diameter in the range of about 40 nm to about 100 nm and an average or median length in the range of about 1 µm to about 10 µm. Silver nanowires can be desirable, since silver is an effective bactericidal agent. In addition, each silver nanowire can have multiple contact points for strong coupling to the porous support. Moreover, silver nanowires can form an efficient, interconnected charge transport network, and intense electric fields due to nanoscale diameter of the silver nanowires can be exploited for highly effective bacterial inactivation.

Referring to FIG. 1, the device 100 is implemented as a gravity-fed device, and can operate at a flow rate in the range of about 10,000 L/(h·m$^2$) to about 200,000 L/(h·m$^2$), about 10,000 L/(h·m$^2$) to about 150,000 L/(h·m$^2$), about 50,000 L/(h·m$^2$) to about 150,000 L/(h·m$^2$), or about 80,000 L/(h·m$^2$) to about 120,000 L/(h·m$^2$), accounting for the active surface area of the porous structure 108. Other flow rates are contemplated, such as in the range of about 1,000 L/(h·m$^2$) to about 10,000 L/(h·m$^2$), about 10 L/(h·m$^2$) to about 1,000 L/(h·m$^2$), or about 1 L/(h·m$^2$) to about 10 L/(h·m$^2$). High-throughput inactivation of bacteria and other pathogens can be achieved by gravity feeding through the porous structure 108 that is placed at a moderate voltage for low power consumption. For example, operation of the device 100 can yield a bacterial inactivation efficiency that is at least about 60%, at least about 70%, at least about 80%, at least about 85%, at least about 90%, at least about 95%, at least about 98%, at least about 99%, at least about 99.5%, at least about 99.9%, at least about 99.95%, at least about 99.99%, at least about 99.999%, at least about 99.9999%, or more. Such inactivation efficiency can be achieved with a short treatment time, such as in the range of about 0.1 sec to about 1 min, about 0.1 sec to about 50 sec, about 0.5 sec to about 40 sec, about 0.5 sec to about 30 sec, about 0.5 sec to about 20 sec, about 0.5 sec to about 10 sec, about 0.5 sec to about 5 sec, about 0.5 sec to about 3 sec, or about 0.5 sec to about 2 sec. In terms of balancing performance versus power consumption, it is contemplated that a pump or other flow control mechanism (not illustrated in FIG. 1) can be included to increase inactivation throughput of the device 100. It is also contemplated that the electrical source 110 can be an oscillating or pulsed source for further improvements in inactivation efficiency, such by inducing an alternating electric field at a frequency in the range of about 1 kHz to about 1,000 kHz, about 10 kHz to about 1,000 kHz, or about 100 kHz to about 1,000 kHz.

Without wishing to be bound by a particular theory, inactivation of bacteria and other pathogens can be achieved in accordance with any one, or a combination, of the following mechanisms. First, silver is an intrinsic bactericidal material, and exposure of bacteria in untreated water to silver nanowires (or nanostructures formed of another bactericidal material) can lead to inactivation of bacteria. Second, the application of a voltage to the porous structure 108 can yield an electric field of sufficient intensity to adversely impact cell viability, by breaking down cell membranes via nanostructure-assisted electroporation. Third, changes to solution chemistry in the presence of an electric field or a current flow, including pH changes as well as in situ formation of bactericidal species, can be another mechanism of sterilization. As noted above, two or more of these mechanisms can operate in concert to inactivate bacteria and other pathogens.

Figure 2:
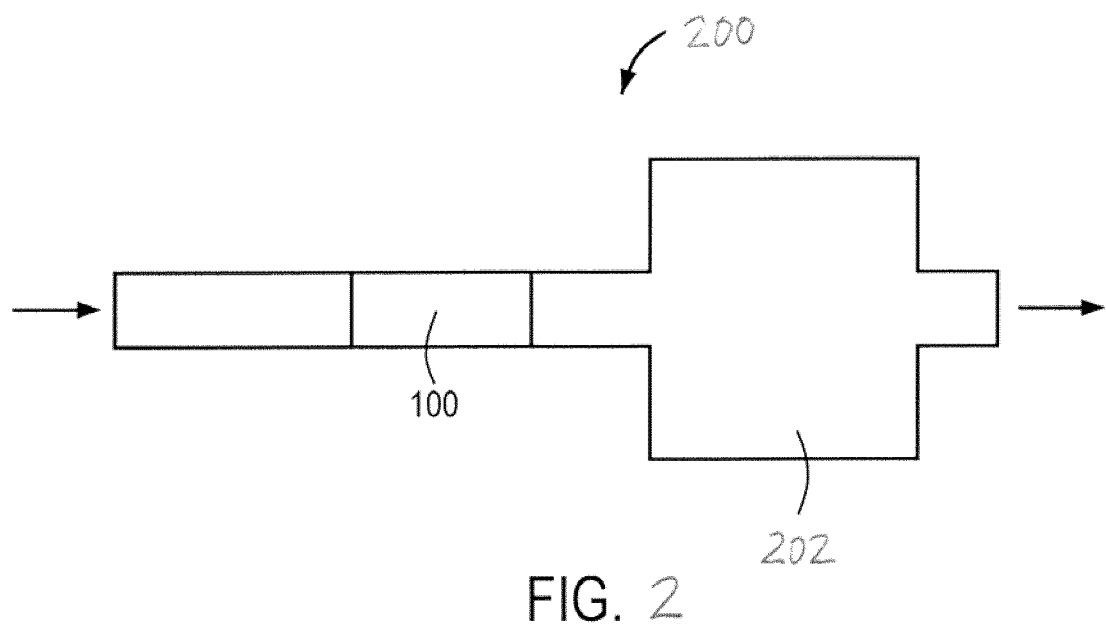
FIG. 2 illustrates a water filtration system implemented in accordance with an embodiment of the invention.

The device 100 can be operated as a point-of-use water filter for deactivating pathogens in water. Alternatively, and as illustrated in FIG. 2, the device 100 can be incorporated in a water filtration system 200, serving as an upstream unit to deactivate organisms that can cause biofouling in a downstream filtration unit 202, such as a reverse osmosis unit in a water desalination plant. The device 100 and other implementations described herein can dramatically lower the operational cost of a wide array of filtration technologies for water as well as food, air, and pharmaceuticals, by reducing the occurrence of biofouling and, therefore, reducing the frequency at which downstream filters are replaced.

Figure 3:
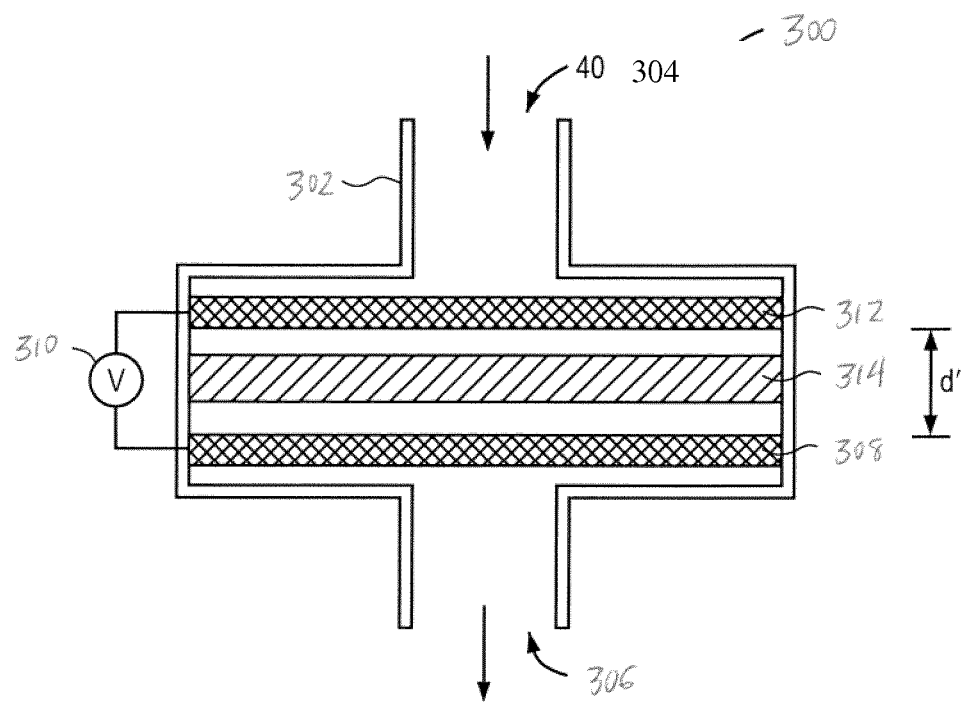
FIG. 3 illustrates a water sterilization device implemented in accordance with another embodiment of the invention.

FIG. 3 illustrates a water sterilization device 300 implemented in accordance with another embodiment of the invention. The device 300 includes a conduit 302, which includes an inlet 304 and an outlet 306. The device 300 also includes a porous electrode 308, which is housed in the conduit 302 and is disposed between the inlet 304 and the outlet 306, and an electrical source 310, which is coupled to the porous electrode 308. Certain aspects of the device 300 can be implemented in a similar manner as previously described with reference to FIG. 1 and FIG. 2, and those aspects are not repeated below.

Referring to FIG. 3, the device 300 includes another porous electrode 312, which is coupled to the electrical source 310. The porous electrode 312 is housed in the conduit 302 and is spaced apart from the porous electrode 308 by a distance d', which can be at least about 5 µm or at least about 10 µm and up to about 100 µm, up to about 200 µm, up to about 500 µm, up to about 1 cm, or up to about 10 cm. A separator 314, which is formed of a porous, insulating material, is disposed between the porous electrodes 308 and 312 to maintain a desired spacing between the porous electrodes 308 and 312 and to prevent electrical shorts. It is contemplated that the separator 314 can be omitted, such as in embodiments in which an insulating coating is incorporated in either, or both, of the porous electrodes 308 and 312. The porous electrodes 308 and 312 can be similarly implemented, or can differ in at least one component, such as in terms of their constituent porous supports, their constituent nanostructures, or both. During operation of the device 300, a stream of water passes through the porous electrodes 308 and 312 and is sterilized upon passing through pores of the porous electrodes 308 and 312. In the illustrated embodiment, sterilization is at least partially achieved via an electrical mechanism, and the electrical source 310 applies a voltage difference between the porous electrodes 308 and 312, such that the stream of water is subjected to an electric field. The inclusion of the pair of porous electrodes 308 and 312 provides two-staged, serial sterilization of the stream of water, and can yield further improvements in bacterial inactivation efficiency, such as at least about 95% or at least about 98%, and up to about 99%, up to about 99.5%, up to about 99.9%, up to about 99.99%, up to about 99.999%, or more.

Figure 4:
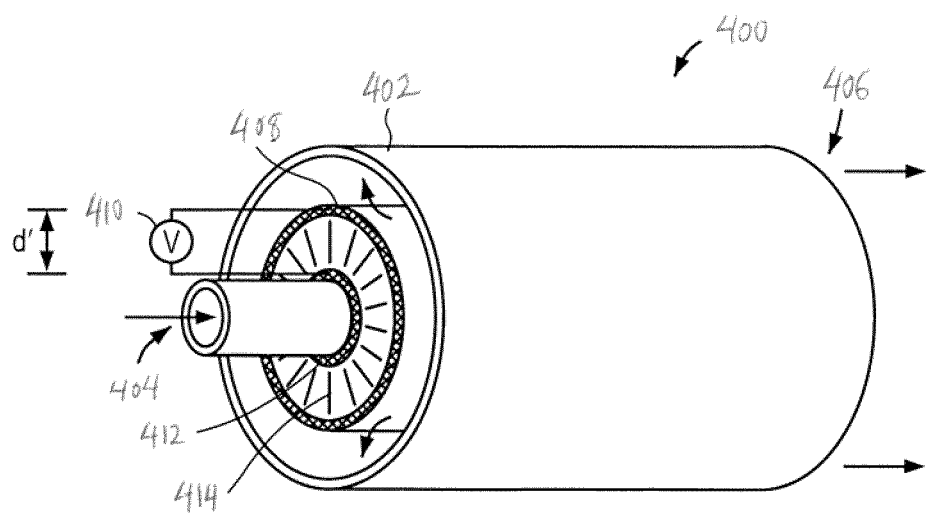
FIG. 4 illustrates a water sterilization device implemented in accordance with yet another embodiment of the invention.

FIG. 4 illustrates a water sterilization device 400 implemented in accordance with yet another embodiment of the invention. The device 400 includes a conduit 402, which includes an inlet 404 and an outlet 406. Housed in the conduit 402 are a pair of porous electrodes 408 and 412, which are coupled to an electrical source 410, and a separator 414, which is disposed between the porous electrodes 408 and 412. Certain aspects of the device 400 can be implemented in a similar manner as previously described with reference to FIG. 1 through FIG. 3, and those aspects are not repeated below.

As illustrated in FIG. 4, the conduit 402, the porous electrodes 408 and 412, and the separator 414 each have a substantially tubular shape, with the separator 414 concentrically disposed adjacent to an exterior surface of the porous electrode 412, and with the porous electrode 408 concentrically disposed adjacent to an exterior surface of the separator 414. During operation of the device 400, a stream of water initially passes through the porous electrode 412, next passes through the separator 414, next passes through the porous electrode 408, and then exits the device 400 through a gap between the conduit 402 and the porous electrode 408. It is also contemplated that the flow direction can be reversed for another implementation.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Sponge-Based Porous Structures

Figure 5:
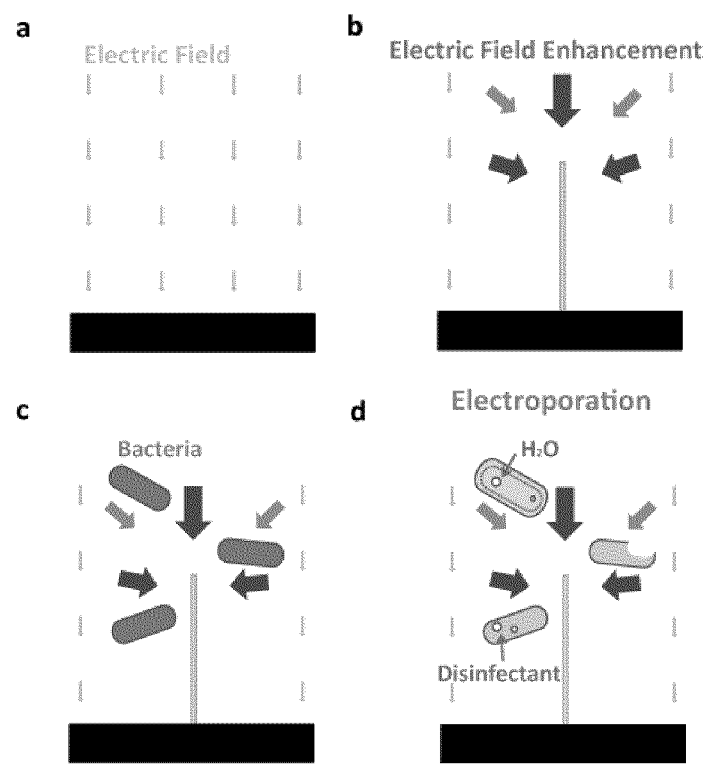
FIG. 5 illustrates schematics of one-dimensional silver nanowire ("AgNW")-assisted electroporation. A) Conductive electrode without nanowire structure with a spaced apart counter electrode. Smaller arrows show an electric field. B) Conductive electrode with AgNW. Larger arrows show the electric field strength enhanced by AgNW. C) Bacteria in water flow in a vicinity of AgNW. D) Bacteria are electroporated and inactivated due to the strong electric field.

Results and Discussion:

This example presents a technique for one-dimensional nanostructure-assisted electroporation, for water sterilization via a device formed of sponge-based electrodes. As shown in FIG. 5, one-dimensional nanostructures can produce an electric field strong enough to cause electroporation under a reduced voltage of several volts, instead of thousands of volts. The small timescale of electroporation occurrence allows a fast treatment of about 1 sec. The sponge-based sterilization device achieved more than about 6 log removal for four model bacteria including *Escherichia coli, Salmonella enterica serovar typhimirium, Enterococcus faecalis*, and *Bacillus subtilis*, and over about 2 log removal of a model virus, bacteriophage MS2, with a low energy consumption of up to about 100 J/L.

Figure 6:
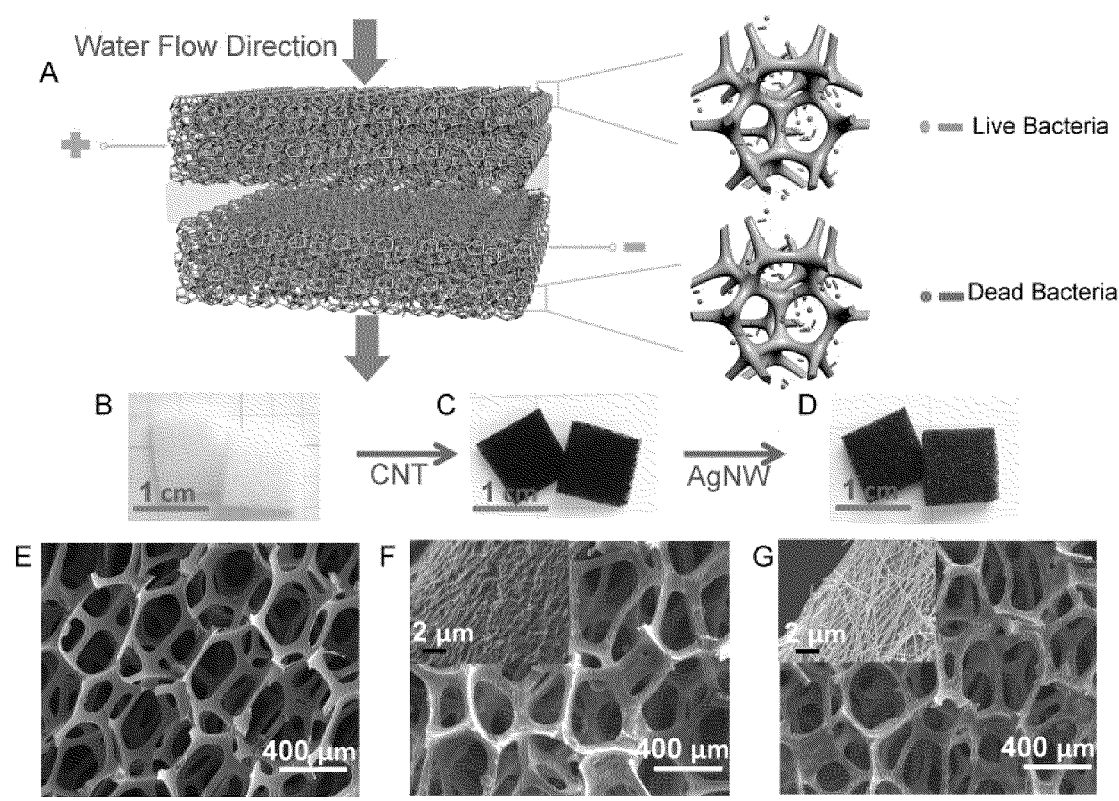
FIG. 6 illustrates schematics and images of sponge-based porous structures. A) Schematics of water sterilization device operation. B) Polyurethane sponge before coating. C) Polyurethane sponge after coating with carbon nanotubes ("CNTs"). D) Polyurethane sponge after coating with CNTs and AgNWs. E) Scanning Electron Microscopy ("SEM") image showing porous framework of polyurethane sponge before coating. F) SEM image showing polyurethane sponge uniformly coated with CNTs. The inset is a SEM image showing surface of polyurethane sponge after coating with CNTs. G) SEM image showing polyurethane sponge uniformly coated with AgNWs after coating with CNTs. Inset is a SEM image showing AgNWs on sponge surface.

The configuration of a water sterilization device is shown in FIG. 6A. The device included a pair of electrically conductive and porous structures, each of which was formed of a polyurethane sponge coated with carbon nanotubes ("CNTs") and silver nanowires ("AgNWs"). The coating of CNTs applied to the sponge renders it conductive. The coating of AgNWs produces a large number of nanoscale sharp tips distributed on the sponge's surface. Because of the AgNWs' high conductivity and the nanoscale tip structure, an electric field in the vicinity of the AgNWs is increased several orders of magnitude over an electric field generated by flat surfaces without nanowires. The polyurethane sponge, which served as a backbone, is inexpensive and flexible. This kind of sponge has substantially uniform pores and provides a continuous framework. To render it conductive, CNTs were coated onto a surface of the sponge by a dip coating method using an aqueous ink of CNTs, and dried at about 90° C. AgNWs were coated by same method using a methanol ink of AgNWs. Finally, the coated sponge was rinsed with distilled water and dried. After coating, the CNTs and the AgNWs were evenly distributed on the sponge's surface, and the framework of the sponge was not altered to a measurable degree. The resistivity of the sponge was decreased to about 1 Ω·cm. A fabrication process and a Scanning Electron Microscopy ("SEM") characterization of a resulting porous structure are shown in FIG. 6B through FIG. 6G. The choice of the sponge material yields several advantages to the porous structure. First, the continuous framework of the sponge with little or no internal loops provides a natural percolation pathway for the CNTs and the AgNWs coating the sponge to render the whole structure conductive. Moreover, a pore size of the sponge is uniformly around 400 µm, which is much larger than typical bacteria and viruses. This prevents pathogens from blocking a water path and a resulting reduction in water flow rate. Furthermore, a three-dimensional framework of the sponge increases an exposure towards pathogens, thereby resulting in enhancement of an antimicrobial function.

Figure 7:
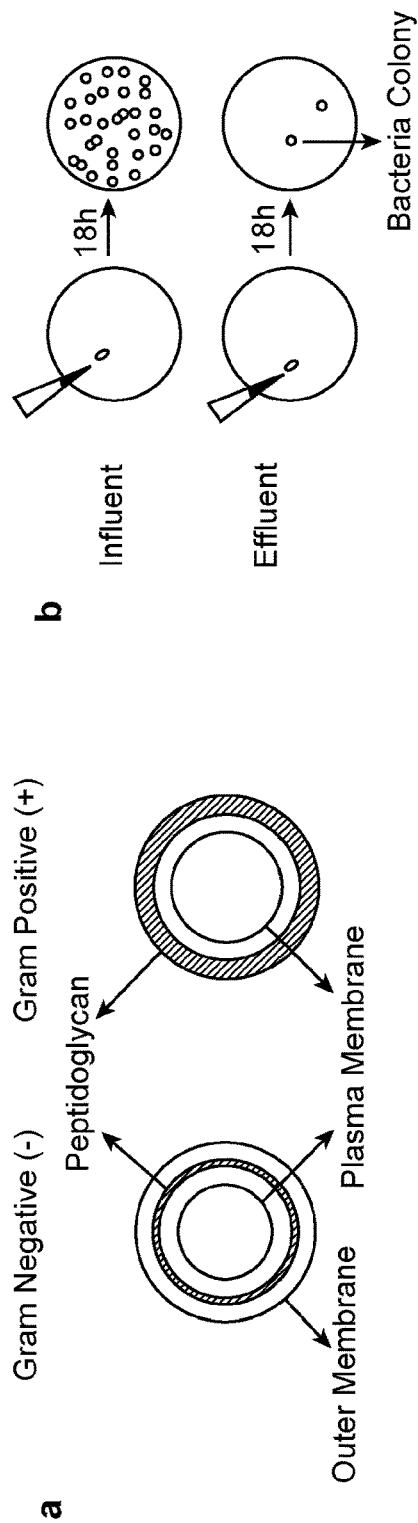
FIG. 7 illustrates bacteria disinfection performance. A) Comparison of membrane structure differences between gram positive and gram negative bacteria. B) Schematic of bacteria viability assessment procedures. C) to F) Disinfection efficiency of *Escherichia coli*, *Salmonella typhimirium*, *Bacillus subtilis*, and *Enterococcus faecalis* under five different voltages. Error bar represents a standard deviation of three replicate measurements of cell concentrations.
Figure 7:
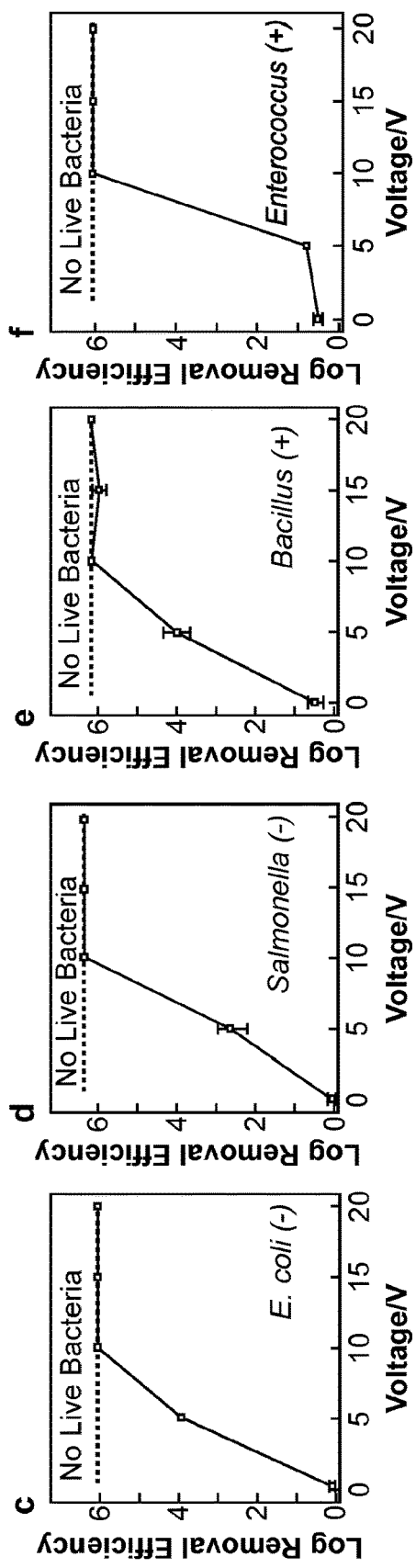

Regarding bacterial diversity, sterilization performance was investigated using four different types of bacteria, namely *Escherichia coli, Salmonella typhimirium, Enterococcus faecalis*, and *Bacillus subtilis*. Based on cell wall structure difference characterized by gram staining method, bacteria can be classified into two groups, namely gram negative and gram positive (see FIG. 7A). Gram positive bacteria typically have a thicker peptidoglycan layer of about 20 nm to about 80 nm, relative to the corresponding one in gram negative bacteria of about 7 nm to about 8 nm. The four chosen bacteria included two gram positive bacteria and two gram negative bacteria. Additionally, *Bacillus subtilis* is a spore forming bacterium and hence may serve as a model for protozoa in disinfection experiments.

During operation, varying external voltages, from 0-20 V, were applied to the pair of porous structures. A flow rate of the device was kept at about 1.5 L/h or about 15,000 L/(h·m$^2$) using a peristalsis pump. An original water sample of about 10$^7$ colony forming units ("CFU")/ml of bacteria was flowed through the device, and treated water was collected from an outlet. Inactivation efficiency was assessed using a plating method (see FIG. 7B). Both original and treated water samples were dispersed onto agar plates, and then subjected to growth overnight. Each live cell would grow into a bacteria colony, and, by counting the number of colonies, bacteria disinfection (or inactivation) efficiency was calculated. Logarithms of disinfection efficiencies of four types of bacteria are shown in FIGS. 7C-7F. The results showed that bacteria disinfection efficiency increased with an increase in external voltage, indicating that a stronger electric field results in more efficient disinfection. For voltages above about 10 V, all four bacteria showed over about 6 log removal with an exposure time of about 1 sec. *Escherichia coli* and *Salmonella typhimirium* were inactivated almost immediately after filtration, while *Enterococcus faecalis* was subjected to a rest or settling period of about 2 h before it was inactivated. Interestingly, this phenomenon was not observed for *Bacillus subtilis*. Settling period can be varied from about 2 h, such as within a range of about 0.5 h to about 4 h or about 1 h to about 3 h. An energy consumption of the device is very low. For example, with a voltage of 10 V, the energy consumption was about 100 J/L.

Figure 8:
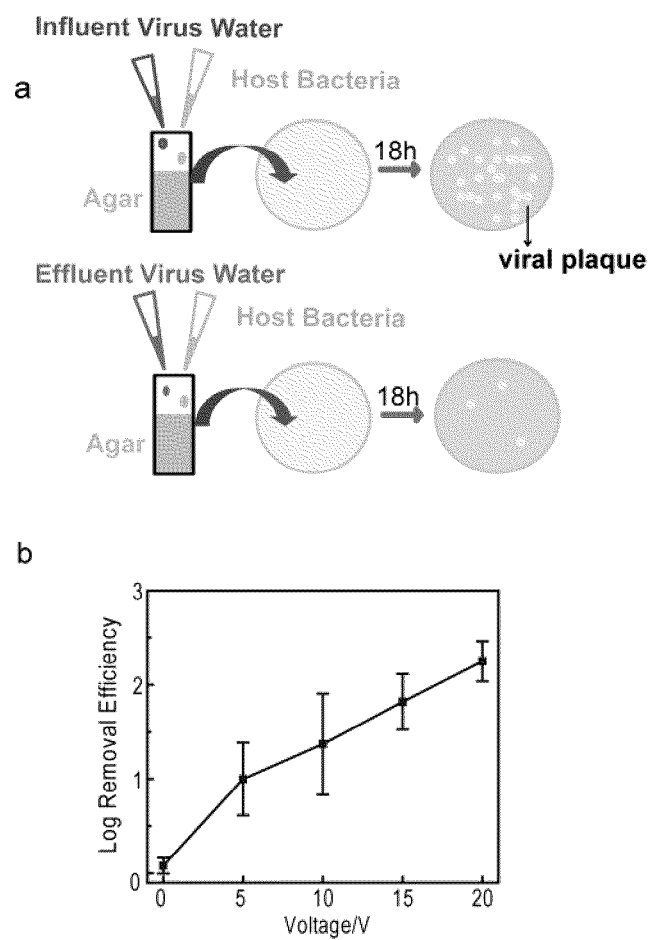
FIG. 8 illustrates bacteriophage MS2 disinfection performance. A) Schematic of virus viability assessment procedures by a double layer plaque assay. B) Disinfection efficiency of MS2 under five different voltages. Error bar represents a standard deviation of three replicate measurements of virus titer.

Sterilization performance towards viruses was also investigated, and results are shown in FIG. 8. Viruses are typically much smaller in dimension than bacteria and are typically more robust. Sterilization performance was tested using bacteriophage MS2, which can serve as a surrogate for human enteric viruses. An original water sample of about 10$^7$ plaque forming units ("PFU")/ml of viruses was flowed through the device at the same flow rate as used for bacteria, namely about 15,000 L/(h·m$^2$). Virus disinfection efficiency was tested at different external voltages from 0-20 V. Disinfection efficiency was evaluated using a double layer plaque assay. Viruses were cultured along with host bacteria overnight. Live viruses would infect bacteria, resulting in plaque forming at a location of a live virus due to absence of bacteria growth. In such manner, virus numbers were assessed by counting the number of plaques formed on agar plates (see FIG. 8A). Disinfection efficiency was calculated by comparing the number of plaques formed from an original water sample and a treated water sample. The results showed a similar trend as that of bacteria (see FIG. 8B). Disinfection efficiency increased with an increase in external voltage. With a voltage of about 20V, about 99.4% of influent viruses were inactivated.

Figure 9:
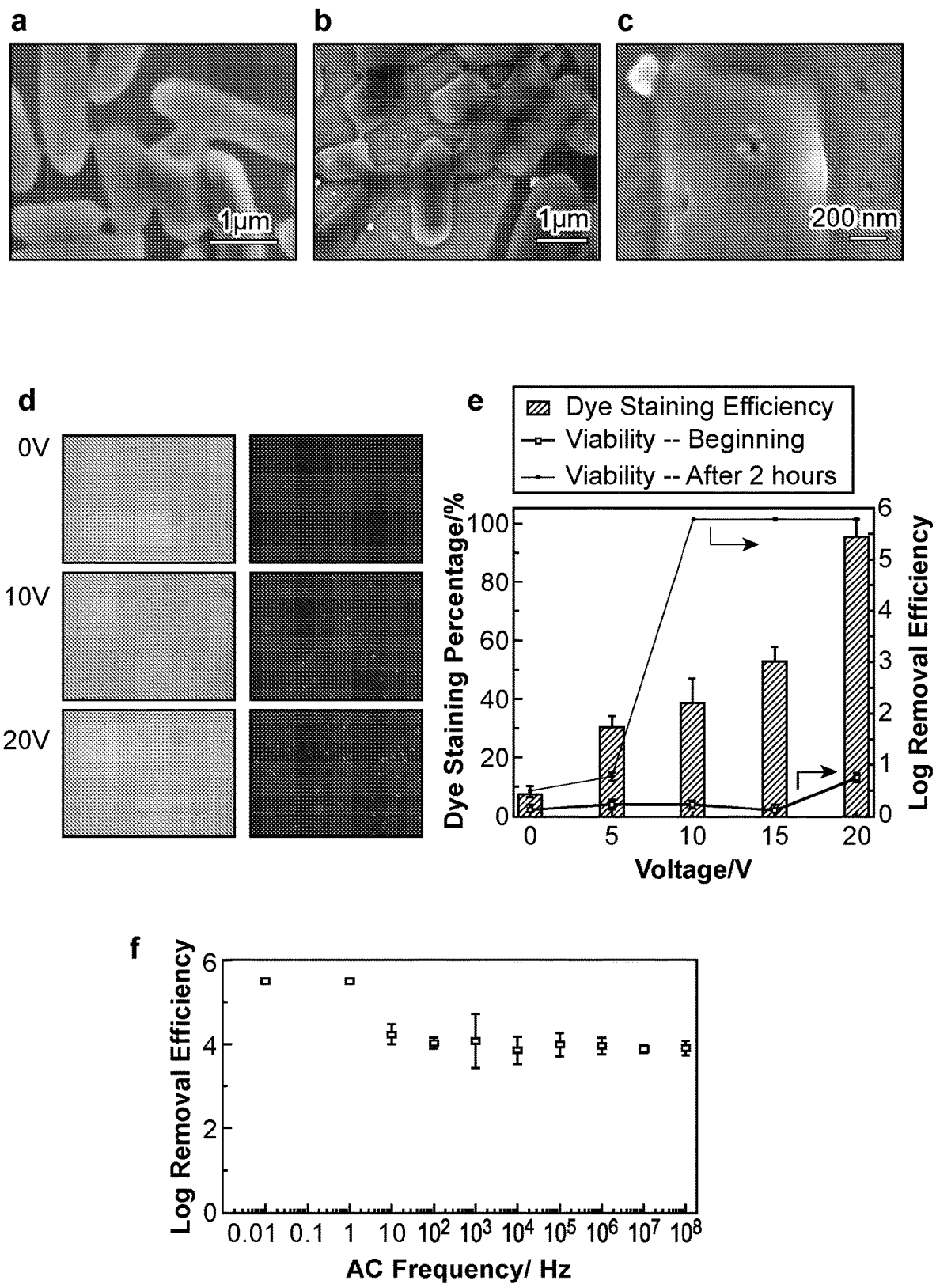
FIG. 9 illustrates electroporation evidence with SEM images, dye staining results, and disinfection with alternating currents. A) SEM image showing morphology of *Escherichia coli* without any treatment. B) SEM image showing pores formed on several different *Escherichia coli* surfaces after treatment at about 20 V. C) High magnification SEM showing more than one pore formed on *Escherichia coli* surface after treatment at about 20 V. D) Microscope images of both bright field and fluorescent on *Enterococci* samples after treatment at voltages of about 0 V, about 10 V, and about 20 V. E) Statistical data showing the percentage of *Enterococcus* stained immediately after treatment accompanied with viability results of both immediately after treatment and 2 h after treatment. F) Disinfection efficiency of *Escherichia coli* with about 10 V of applied alternating voltage at different frequencies.

In the device, the bacterial disinfection mechanism was confirmed to be electroporation based on *Escherichia coli* and *Enterococcus faecalis* using Scanning Electron Microscopy ("SEM") and epi-fluorescent microscopy with membrane permeability dyes, respectively. First, SEM was used to characterize fixed *Escherichia coli*, both untreated and treated by the sponge-based device (FIGS. 9A-9C). The SEM images show bacterial membrane damage after treatment. Small pore structures are present on the bacteria surfaces; some bacteria have more than one pore on their surfaces. Dye staining experiments further confirmed that electroporation led to compromised cellular membranes and likely cell death. Propidium iodide ("PI"), a DNA stain, enters cells when their membranes are compromised, and appears red under an epi-fluorescent microscope. PI dye was used to stain *Enterococcus faecalis* immediately after treatment. Bacteria were washed using phosphate buffer solution to remove excess free PI dye molecules in solution. Fluorescent microscope images (see FIG. 9D) showed that the number of stained cells increased as an applied voltage increased, and, at about 20V, almost all the bacteria were stained. This result again indicates that electroporation is occurring even at low voltages when with assistance of nanowires.

An interesting phenomenon was observed with *Enterococcus faecalis*, which further supports the electroporation mechanism. Immediately after treatment, the bacteria were stained, and membrane damage was observed. However, when plated at this stage, the bacteria were still able to reproduce and formed colonies on agar. This observation indicates that some electroporation-generated pores are repairable, and cells with the pores may be able to reproduce in a nutrient rich environment. This phenomena was more noticeable for samples treated using voltages above about 10V (see FIG. 9E). However, after letting the treated water rest for about 2 h prior to plating without any additional treatment, *Enterococcus faecalis* was not able to reproduce and form colonies on agar. Thus, this result indicates that the cells die during the rest period, potentially due to osmotic pressure differences or chemical imbalance between intercellular and extracellular environments.

Considering the timescale of diverse processes occurring using electricity during treatment, electroporation, at the timescale of ns, is fast enough to be differentiated from other factors by changing a frequency of an applied voltage. By increasing alternating current frequency from about 0 to about 10$^8$ Hz at about 10 V of the applied voltage, the contribution of processes occurring at longer timescale than electroporation, such as electrochemical reactions, can be reduced gradually. The inactivation efficiency of *Escherichia coli* in FIG. 9F shows that disinfection is substantially constant at frequencies from about 100 Hz to about 100 MHz of about 4 log removal, which points to electroporation as the mechanism of cell inactivation. The inactivation efficiency difference between low frequency and high frequency reveals that both reversible and irreversible electroporation occur. And other electrochemical related factors like Ag$^+$ in water can improve pathogen inactivation by entering cells after electroporation.

Figure 10:
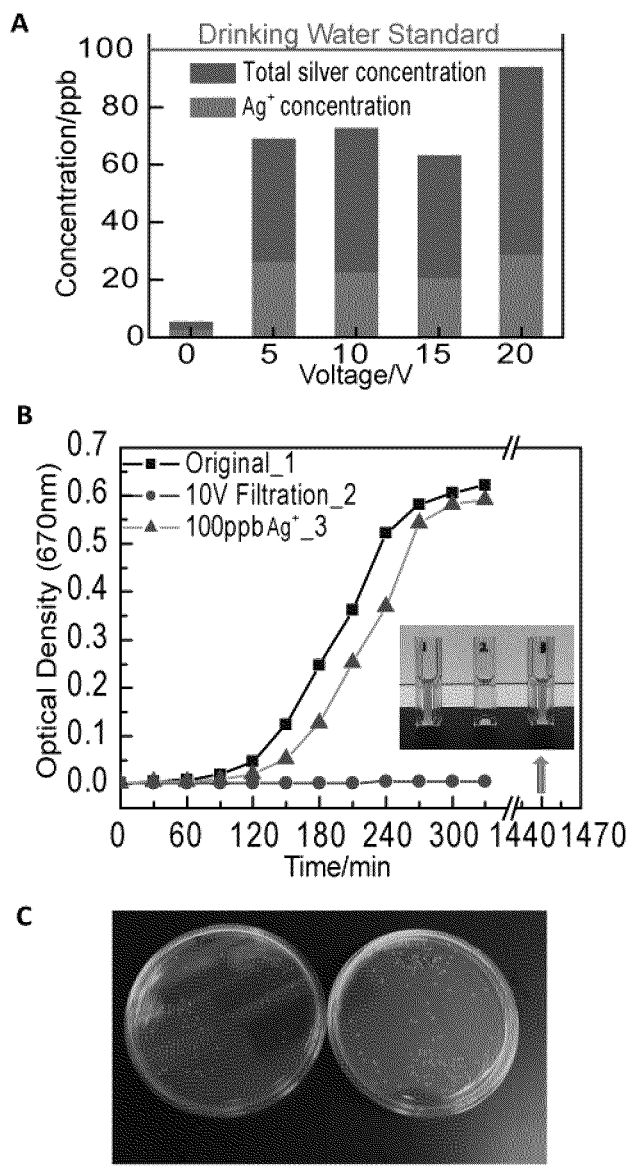
FIG. 10 illustrates an evaluation of silver's bactericidal effect. A) Silver ion and total silver concentration in effluent water at five different voltages of about 0 V, about 5 V, about 10 V, about 15 V, and about 20 V, as measured by Inductively Coupled Plasma-Mass Spectrometry. B) Growth comparison: growth curves of *Escherichia coli* without any treatment, *Escherichia coli* treated at about 10 V, and *Escherichia coli* treated with about 100 parts per billion ("ppb") silver ion. The inset is a picture of liquid mediums of the above three samples after 24 h culture. C) Picture showing *Escherichia coli* cultured using both filtered de-ionized water (left) and unfiltered de-ionized water (right) on agar plates. Both plates are about 10,000 times dilutions of original samples.

The effect of silver from the AgNWs was examined to assess whether it complements the inactivation occurring via electroporation and whether silver in an effluent poses a health risk. Total silver (ion and particle) concentrations in the effluent were measured using Inductively Coupled Plasma-Mass Spectrometry ("ICP-MS"). From about 5 V to about 15 V, the effluent has a silver concentration of about 70 parts per billion ("ppb"). The highest silver release occurred at about 20 V, and the total silver concentration in the effluent was about 94 ppb, just below the national drinking water standard of 100 ppb (see FIG. 10). The disinfection effect of silver was examined and determined to be minor compared to electroporation. In this example, $Ag^+$ or other electrochemically generated species alone, in the absence of an electric field, showed little disinfection efficiency (see FIG. 10).

Therefore, the mechanism of water sterilization in the current example at least partially relies on a high electric field. When bacteria pass through the two parallel, sponge-based structures, their membranes are damaged because of electroporation. This damage can lead to inactivation of the bacteria, since the bacteria can no longer isolate themselves from an extracellular environment that is quite different chemically and physically relative to an intracellular environment. And because of an osmotic pressure difference inside and outside of the bacteria, a sufficient amount of water can flow into the bacteria, causing the bacteria to swell and leading to inactivation. Alternatively, or in conjunction, the osmotic pressure difference can allow an antimicrobial, such as silver ion, to readily enter a cell, and can increase an efficiency of its antimicrobial function. Hence, a small amount of silver ion can aid in disinfection of bacteria in a large volume of water. This mechanism is also consistent with the observation that gram positive bacteria sometimes were more difficult to inactivate than gram negative bacteria, in view of a thicker layer of peptidoglycan in gram positive bacteria that can impede the occurrence of electroporation. Based on the disinfection study of bacteria, viruses are expected to be inactivated by a similar mechanism. Since viruses are of dimensions much smaller than bacteria, a larger electric field (which can be represented as inversely proportional to sizes of the viruses) is expected to establish the same or similar transmembrane potential for electroporation to occur. This is also consistent with the results that disinfection efficiency of viruses was lower than the corresponding efficiency of bacteria using the same external voltage. The ability of the sponge-based structures to inactivate protozoa, such as *Cryptosporidium* and *Giardia*, was not specifically evaluated. However, the sponge-based structures efficiently inactivated *Bacillus subtilis*, which can serve as a surrogate for protozoa because it is a spore-forming bacterium.

In such manner, a water sterilization device can be implemented so as to be highly effective towards different pathogens including bacteria and viruses. The high water treatment speed, low energy consumption, and low cost render the device desirable for point-of-use water treatment and other applications.

Figure 11:
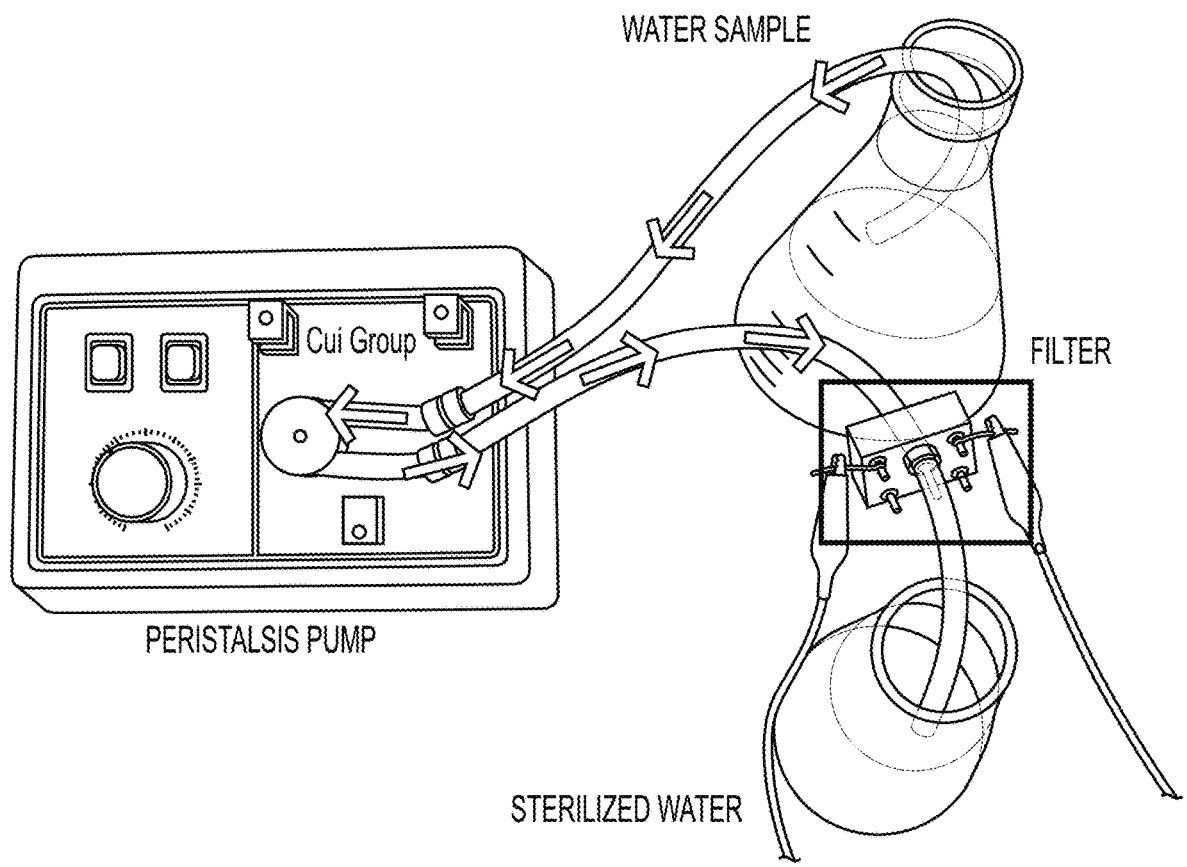
FIG. 11 illustrates an experimental set-up with a water sample treated by sponge-based porous structures at a rate controlled by a peristalsis pump.

Porous Structure Synthesis:

A CNT ink was prepared by dispersing about 0.1 wt. % single-walled CNTs (Carbon Solution, Inc., CA) in water with about 1 wt. % sodium dodecylbenzene sulfonate as a surfactant. The CNTs were dispersed in water by about 5 min bath sonication and about 30 min probe sonication. AgNWs were synthesized by a polyol method. Specifically, about 25 mg of AgCl was reduced in about 30 ml of ethylene glycol with about 330 mg of poly(vinylpyridine) at about 170° C., and then about 110 mg of $AgNO_3$ in about 10 mL of ethylene glycol was added slowly. After synthesis was completed, AgNWs were transferred to methanol by centrifuging at about 6,000 rpm (FISHER accuSpin 400) three times to yield an AgNW ink. A polyurethane sponge (McMaster-Carr, CA) was dipped into the CNT ink, dried at about 90° C., and washed with DI water. This dipping process was repeated three times. AgNWs were coated by dipping the sponge into the AgNW ink, dried at about 90° C., and washed with DI water. Afterwards, the sponge was cut into desired sizes (1 cm×1 cm×0.2 cm), and resulting sponge-based structures were placed into a device chamber and connected to a peristalsis pump. An experimental set-up is shown in FIG. 11.

Bacteria Inactivation Measurements:

*Escherichia coli* (JM109, Promega), *Salmonella typhimirium* LT2 (ATCC 700720), *Enterococcus faecalis* (ATCC 19433), and *Bacillus subtilis* (ATCC 6633) were cultured to log phase (about 4-6 h), harvested by centrifugation at about 900 g, and re-suspended in DI water, after which the bacteria were centrifuged and re-suspended in DI water 2 more times. Bacteria were then diluted using DI water to about $10^7$ CFU/mL. Twenty milliliters of the solution was stored as control at room temperature. Fifty milliliters of each bacterial solution were passed through the sponge-based structures at about 1.5 L/h while different voltages (0, 5, 10, 15 and 20 V) were applied. The effluent was collected in autoclaved containers. Bacterial concentrations in the effluent and control solutions were measured using standard spread plating techniques. Each sample was serially diluted, and each dilution was plated in triplicate and incubated at about 37° C. for about 18 h. Treated and control samples were compared to determine the extent of inactivation.

Virus Inactivation Measurements:

Bacteriophage MS2 was grown with *Escherichia coli* Famp host on a shaker table set to about 25 rpm at about 37° C. for about 24 h. MS2 was isolated and concentrated using the polyethylene glycol precipitation method. A solution of about $10^7$ PFU/mL was made. A portion of this solution was stored at room temperature in the dark to serve as a control. The remaining solution was passed through the sponge-based structures in about 50 mL aliquots while using different voltages (0, 5, 10, 15 20 V) at a flow rate of about 1.5 L/h. MS2 was enumerated in the control and filter effluent using a double agar layer method. Treated and control samples were compared to determine the extent of inactivation.

Bacteria Sample Preparation for SEM Characterization:

Both a control sample and a sample treated at about 20 V for *Escherichia coli* were pelleted by centrifuging at about 4,000 rpm for about 10 min, and a supernatant was removed. Both samples were fixed using a solution of about 0.1 M sodium cacodylate buffer (pH of about 7.3), about 2% glutaraldehyde, and about 4% paraformaldehyde at about 4° C. overnight, and then washed with the same buffer for about 5 min. Samples were dispersed on a metal grid and dried in air for SEM characterization.

ICP-MS Measurements:

Each of five treated bacteria solutions from different voltages was divided into two groups. The first group of the five samples and a control sample were treated by adding $HNO_3$ to about 2%. The second group was treated with about 70% $HNO_3$ and kept at about 50° C. in a water bath overnight, and then diluted to 2% $HNO_3$ solution. All samples were filtered with a 0.2 µm filter. The first group and the control sample were characterized for silver ion concentration, and the second group was characterized for total silver concentration.

Growth Curve:

An original solution of about $10^7$/mL of *Escherichia coli* was divided into three parts. A first sample is a control sample. A second sample was treated with a sponge-based structure at about 10 V with a flow rate of about 1.5 L/h. And a third sample was treated with about 100 ppb silver ion. After treatment, about 1 ml of each sample was added into about 30 ml of Tryptic Soy Broth ("TSB") medium and cultured at about 37° C. on a shaker table set to about 25 rpm for about 24 h. Optical density was measured using a spectrometer every 30 min for each sample at a wavelength of 670 nm.

PI Dye Staining:

After treating bacterial solutions through the sponge-based structure with different voltages (0, 5, 10, 15, 20 V), about ten microliters of 1 mg/mL PI dye solution was added into about 10 mL of each effluent for a final concentration of about 1 μg/mL. This mixture was allowed to rest for about 5 min at room temperature and then centrifuged at about 4,000 rpm for about 10 min. These samples were then washed using a phosphate buffer solution 3 times at the same condition. Samples were examined using fluorescent microscopy.

Examination of Silver's Bactericidal Effect:

To determine the effect of silver ion on inactivation, an experiment was carried out to compare inactivation with silver alone (about 100 ppb) to treatment with the sponge-based structure at about 10 V using *Escherichia coli*. Same starting *Escherichia coli* solutions were treated respectively with about 100 ppb silver ion and about 10 V with the sponge-based structure. Small volumes of both treated solutions were added to a nutrient broth as a growth medium. Optical density of the growth medium was measured every about 30 min with a spectrometer using a wavelength of about 670 nm to generate a growth curve to assess the presence of culturable bacteria in both treated solutions (see FIG. 10B). Broth inoculated with a control sample of starting bacteria solution that did not receive any treatment showed an exponential growth phase beginning at about 60 min after inoculation. A sample treated with about 100 ppb $AgNO_3$ solution showed a longer lag phase before exponential growth, which started at about 120 min. A sample treated with the sponge-based structure showed no detectable growth. Even after 24 h of incubation, the broth inoculated with effluent from the sponge-based structure was free of bacteria growth (see FIG. 10B inset). Thus, disinfection using the sponge-based sterilization device was more effective than using silver ions alone, indicating that disinfection relied on electroporation.

The effect of electrochemically generated species from the sponge-based structure was also examined and confirmed to yield no detectable disinfection effects. Two parallel experiments were carried out at about 10 V of treatment. The difference between the two experiments was that, with DI water being pumped through the device, *Escherichia coli* was introduced in one experiment before the inlet and right after the outlet in another experiment, so that both *Escherichia coli* samples would experience the same water environment with the same concentration of silver; however, the sample introduced before the inlet would experience a high electric field. *Escherichia coli* introduced right after the outlet has a concentration of bacteria nearly the same as the initial concentration introduced. That is, no detectable disinfection occurred (FIG. 10C). In contrast, bacteria introduced before the inlet were substantially completely inactivated. This result confirms that electrochemically generated or washed off silver or other species do not inactive bacteria to a detectable extent in the absence of an electric field. This results further confirms that electroporation is the dominant mechanism of water disinfection.

Figure 12:
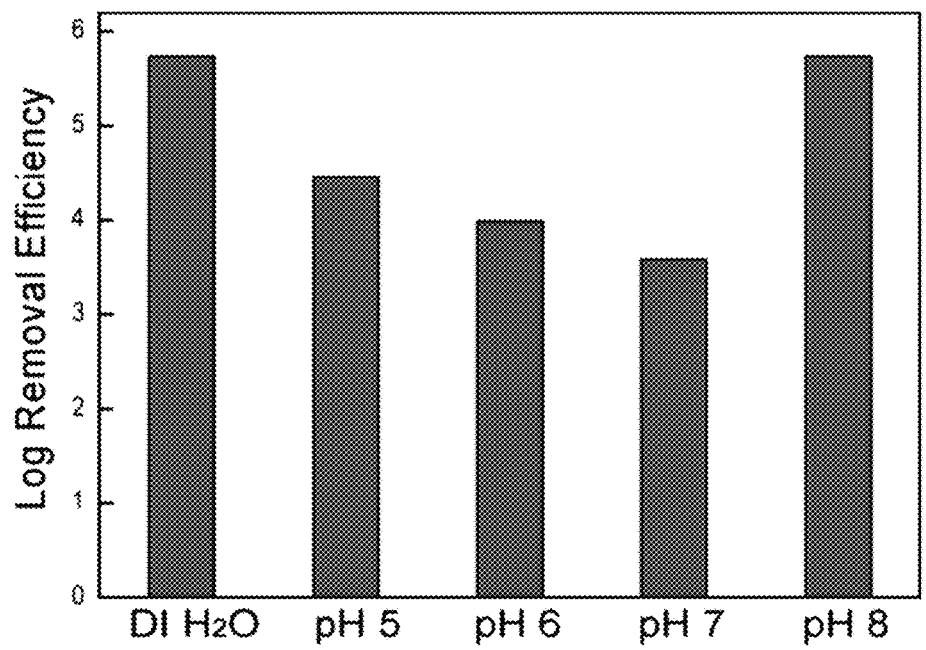
FIG. 12 illustrates disinfection efficiency of *Escherichia coli* treated at about 10 V in phosphate buffer solutions of different pH's compared to DI water.

Disinfection Efficiency at Different pH:

Bacteria solution chemistry can influence disinfection efficiency. After treatment, reversible electroporation pores may start to heal and close. Disinfection efficiency of *Escherichia coli* treated at about 10 V was evaluated in phosphate buffer solutions of different pH's compared to DI water. As shown in FIG. 12, a buffer solution with a pH of 7 showed the lowest disinfection efficiency.

Example 2

Dielectric-Coated Porous Structures

Figure 13:
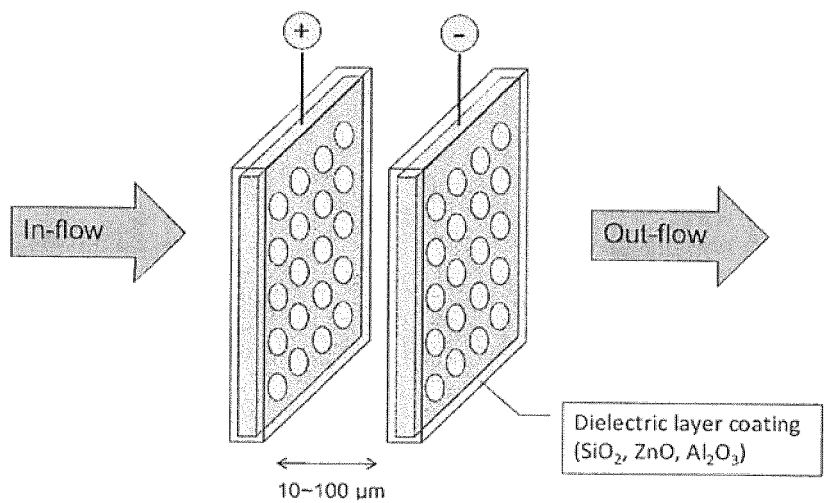
FIG. 13 illustrates a schematic of water sterilization device operation using dielectric-coated porous structures.

The configuration of a water sterilization device is shown in FIG. 13. The device included a pair of electrically conductive, metal meshes. Although not shown in FIG. 13, a textile in the form of a piece of cloth was used as a separator between the pair of metal meshes. Sterilization performance was evaluated for two test configurations in which metal meshes were coated with a dielectric material at a thickness of about 0.7 μm and about 1.5 μm, respectively. Coating of the dielectric material was carried out via plasma enhanced chemical vapor deposition. A control configuration was also evaluated, with the absence of the dielectric material coating. During operation, varying external voltages, from 0-20 V, were applied to the pair of metal meshes, and a flow rate of the device was kept at about 1.5 L/h. An in-flow water sample with an initial concentration ($C_o$) of bacteria was flowed through the device, and an out-flow water sample with a treated concentration (C) of bacteria was collected. Inactivation efficiencies were calculated as $(1-C/C_o)$, and logarithms of inactivation efficiencies were calculated as $(-\log_{10}(C/C_o))$. Results are set forth below in Table 1. The results showed that bacteria inactivation efficiency increased with an increase in external voltage, and that the inclusion of the dielectric material coating allowed a high inactivation efficiency to be attained with reduced power consumption. For example, at a common voltage of 5 V, the test configuration with the dielectric coating of about 1.5 μm in thickness yielded an inactivation efficiency of greater than 99.99% with a low power consumption of about 4.8 mW, while the test configuration with the dielectric coating of about 0.7 μm in thickness yielded a somewhat lower inactivation efficiency of about 99.98% with a higher power consumption of about 85 mW, and while the control configuration without the dielectric coating yielded a yet lower inactivation efficiency of about 99.91% with a yet higher power consumption of about 400 mW.

TABLE 1

| $SiO_2$ coating | Voltage (V) | Current (mA) | Power (mW) | Log efficiency | Efficiency (%) |
|---|---|---|---|---|---|
| No $SiO_2$ | 20 | 200 | 4,000 | 5.135133 | 99.9993 |
|  | 10 | 273 | 2,730 | 5.135133 | 99.9993 |
|  | 5 | 80 | 400 | 3.05 | 99.9109 |
|  | 2 | 25.5 | 51 | 0.19 | 35.4346 |
|  | 0 | 0 | 0 | 0.03 | 6.6746 |
| ~0.7 μm | 20 | 35-50 | 700-1,000 | 5.135133 | 99.9993 |
|  | 10 | 52-60 | 520-600 | 5.135133 | 99.9993 |
|  | 5 | 16-18 | 80-90 | 3.834103 | 99.9853 |
|  | 2 | 6.4-6.6 | 12.8-13.2 | 2.436163 | 99.6337 |
| ~1.5 μm | 10 | 3.8-4.1 | 38-41 | 4.50515 | 99.9969 |
|  | 5 | 0.95-0.98 | 4.75-4.9 | 4.50515 | 99.9969 |
|  | 2 | 0.34-0.36 | 0.68-0.72 | 3.50515 | 99.9688 |
|  | 1 | 0.18-0.19 | 0.18-0.19 | 2.50515 | 99.6875 |

Example 3

Copper Oxide Nanowire-Based Electrodes

Figure 14:
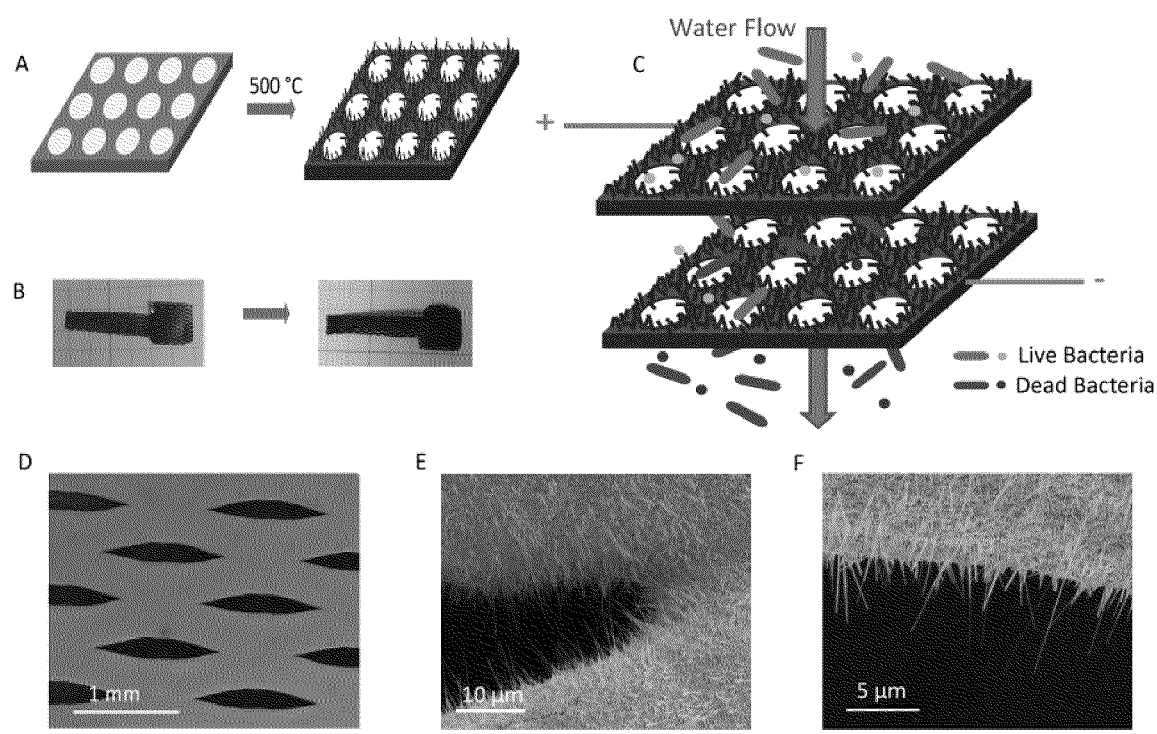
FIG. 14 illustrates schematics and images of copper oxide nanowire ("CuONW")-based electrodes. A) Schematic of CuONW synthesis procedure. B) Pictures showing electrode before synthesis (copper mesh) and after synthesis (CuONW mesh). C) Schematic of CuONW-based electrodes during operation. D) to F) SEM images of CuONW-based electrode.

The configuration of a water sterilization device is shown in FIG. 14C. The device includes a pair of electrodes each including one layer or multiple layers of mesh covered with copper oxide nanowires ("CuONWs"). Although not shown in FIG. 14C, a separator can be disposed between the pair of electrodes. The CuONW meshes are synthesized according to the technique set forth in Jiang et al., "CuO Nanowires Can Be Synthesized by Heating Copper Substrates in Air," Nano Letters, Vol. 2, No. 12, 2002, pp 1333-1338, the disclosure of which is incorporated herein by reference in its entirety. Specifically, a copper mesh is heated at about 500° C., or another temperature in a range of about 300° C. to about 700° C. or about 400° C. to about 600° C., to form CuONWs covering the copper mesh (see FIG. 14A). FIGS. 14B and 14D-14F shows optical and SEM characterization of the resulting electrodes.

Figure 15:
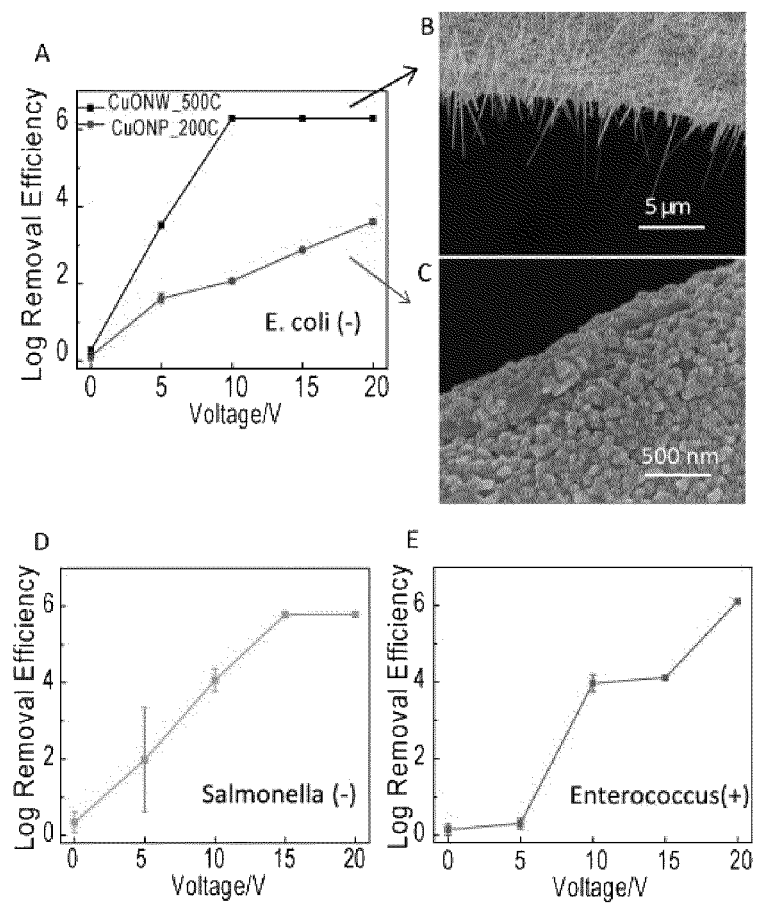
FIG. 15 illustrates bacteria disinfection performance of CuONW-based electrodes. A) Disinfection efficiency of *Escherichia coli* by CuONW-based and copper oxide nanoparticle ("CuONP")-based electrodes at five different voltages. B) SEM image of CuONW-based electrode. C) SEM image of CuONP-based electrode. D) to E) Disinfection efficiency of *Salmonella typhimirium* and *Enterococcus faecalis* by CuONW-based electrodes at five different voltages.
Figure 16:
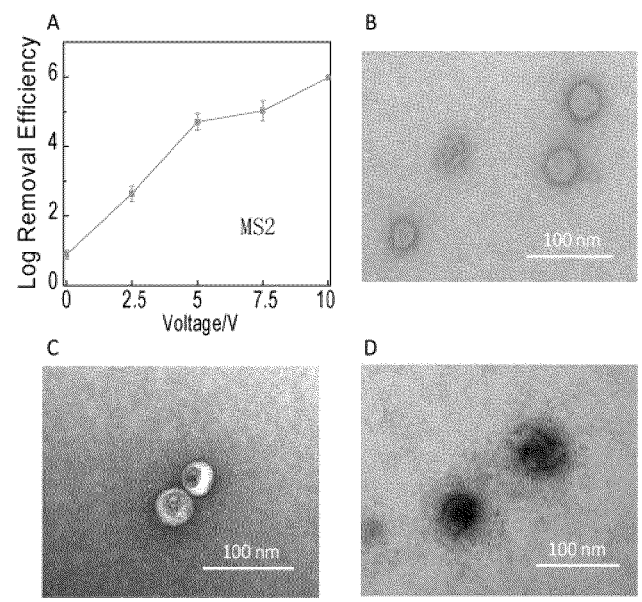
FIG. 16 illustrates bacteriophage MS2 disinfection performance of CuONW-based electrodes. A) Disinfection efficiency of MS2 by CuONW-based electrodes at five different voltages. B) Transmission Electron Microscopy ("TEM") image of untreated MS2. C) TEM image of MS2 after treatment by CuONW-based electrodes at about 5 V. D) TEM image of MS2 after treatment by CuONW-based electrodes at about 10 V.

Sterilization performance for *Escherichia coli* was evaluated for the CuONWs-based electrodes versus a control configuration using copper meshes covered with copper oxide nanoparticles ("CuONPs"). During operation, varying external voltages, from 0-20 V, were applied to the electrodes, an in-flow water sample with an initial concentration ($C_o$) of bacteria was flowed through the device, and an out-flow water sample with a treated concentration (C) of bacteria was collected. Inactivation efficiencies were calculated as $(1-C/C_o)$, and logarithms of inactivation efficiencies were calculated as $(-\log_{10}(C/C_o))$. Results are set forth in FIG. 15A. The results showed that the inclusion of CuONWs yielded higher inactivation efficiencies relative to the control configuration. The CuONWs-based electrodes also efficiently inactivated *Salmonella typhimirium, Enterococcus faecalis*, and bacteriophage MS2, as shown by results set forth in FIGS. 15D, 15E, and 16.

Figure 17:
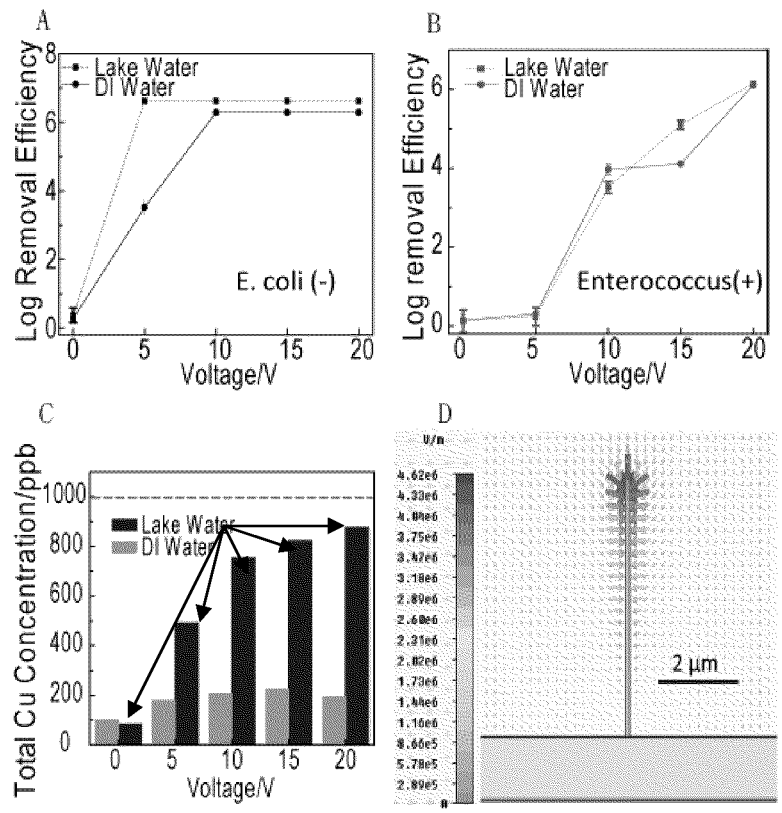
FIG. 17: A) and B) Sterilization performance for *Escherichia coli* and *Enterococcus faecalis* in DI water and lake water by CuONWs-based electrodes at five different voltages. C) Total copper concentration in effluent of DI water and lake water samples at five different voltages. D) Simulation results of an electric field in a vicinity of a single CuONW with an applied voltage of about 10 V.

FIGS. 17A and 17B show sterilization performance for *Escherichia coli* and *Enterococcus faecalis* in DI water and lake water by the CuONWs-based electrodes at five different voltages. FIG. 17C show total copper concentration in effluent of DI water and lake water samples at five different voltages (about 0 V, about 5 V, about 10 V, about 15 V, and about 20 V), as measured by ICP-MS. FIG. 17D show simulation results of an electric field in a vicinity of a single CuONW with an applied voltage of about 10 V.

Example 4

Silicon Nanowire-Based Electrodes

Figure 18:
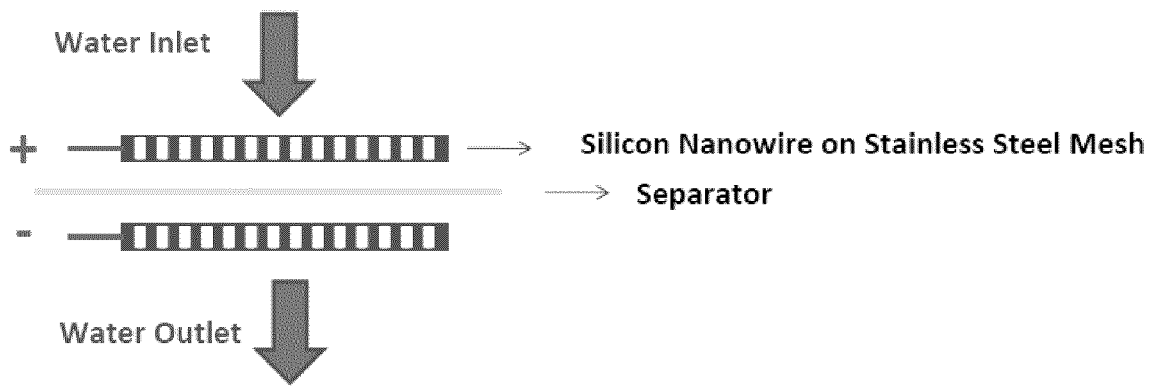
FIG. 18 illustrates a schematic of water sterilization device operation using silicon nanowire-based electrodes.

The configuration of a water sterilization device is shown in FIG. 18. The device includes a pair of electrodes each including one layer or multiple layers of mesh with silicon nanowires covered on surfaces. As shown in FIG. 18, a separator is disposed between the pair of electrodes. The silicon nanowires are synthesized on stainless steel meshes using gold catalyst, according to the vapor-liquid-solid technique set forth in Chan et al., "High Performance Lithium Battery Anodes Using Silicon Nanowires," Nature Nanotechnology, Vol. 3, 2008, pp. 31-35, the disclosure of which is incorporated herein by reference in its entirety.

Figure 19:
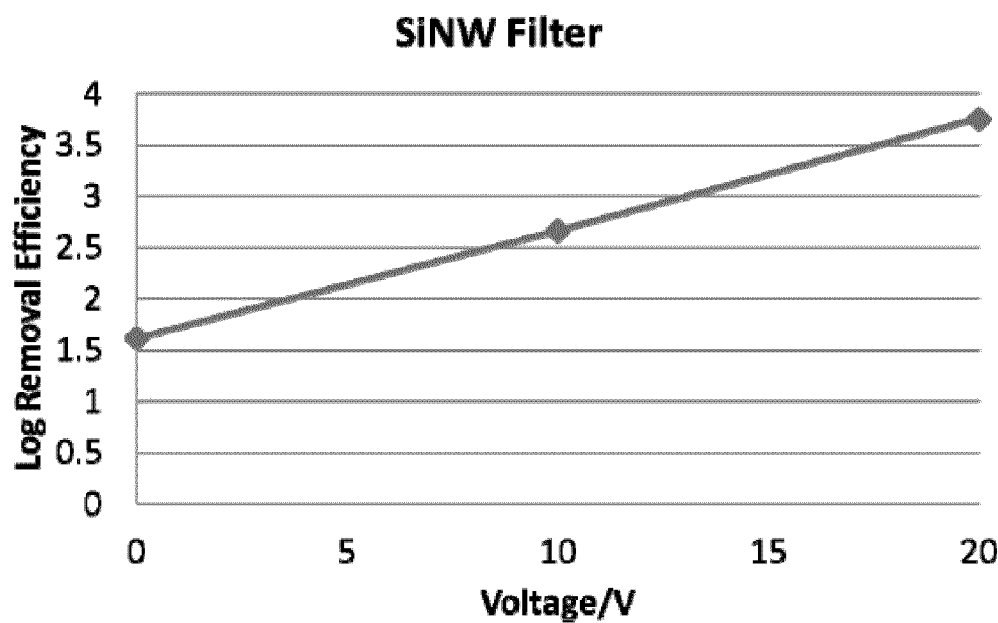
FIG. 19 illustrates bacteria disinfection performance of silicon nanowire-based electrodes.

Sterilization performance was evaluated for the silicon nanowire-based electrodes. During operation, varying external voltages, from 0-20 V, were applied to the electrodes, an in-flow water sample with an initial concentration ($C_o$) of bacteria was flowed through the device, and an out-flow water sample with a treated concentration (C) of bacteria was collected. Inactivation efficiencies were calculated as $(1-C/C_o)$, and logarithms of inactivation efficiencies were calculated as $(-\log_{10}(C/C_o))$. Results are set forth below in FIG. 19. The results showed that bacteria inactivation efficiency increased with an increase in voltage, and that the inclusion of the silicon nanowires allowed a high inactivation efficiency to be attained.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A water sterilization device comprising:
    a conduit including an inlet to provide entry of untreated water and an outlet to provide exit of treated water;
    a porous electrode housed in the conduit and disposed between the inlet and the outlet, the porous electrode including an electrically conductive mesh, nanostructures coupled to a surface of the electrically conductive mesh, and an insulating coating conformally disposed to cover an active surface of the electrically conductive mesh;
    a counter electrode housed in the conduit and spaced apart from the porous electrode, wherein the counter electrode and the porous electrode are spaced apart by 1 to 100 μm; and
    an electrical source coupled to the porous electrode and the counter electrode to apply a voltage difference between the porous electrode and the counter electrode, wherein the porous electrode includes pores sized in a range of 5 μm to 400 μm.

2. The water sterilization device of claim 1, wherein the electrically conductive mesh is a copper mesh.

3. The water sterilization device of claim 1, wherein the electrically conductive mesh is a stainless steel mesh.

4. The water sterilization device of claim 1, wherein the porous electrode is a first porous electrode, and further comprising a second porous electrode housed in the conduit and spaced apart from the first porous electrode, and the electrical source is coupled to the second porous electrode to apply a voltage difference between the first porous electrode and the second porous electrode.

5. The water sterilization device of claim 1, wherein the electrical source is an oscillating voltage source.

6. The water sterilization device of claim 5, wherein the oscillating voltage source is configured to induce an alternating electric field at a frequency in a range of 0.5 Hz up to 1,000 kHz.

7. The water sterilization device of claim 1, wherein the pores are sized in a range of 30 μm to 300 μm.

8. The water sterilization device of claim 1, wherein the porous electrode has a porosity of 0.1 and up to 0.95.

9. The water sterilization device of claim 1, wherein the insulating coating has a thickness in a range of 100 nm to 10 µm.

10. The water sterilization device of claim 1, wherein the insulating coating comprises one of a metal oxide, silicon oxide, a carbide, a boride, a nitride, or a silicide.

11. A water sterilization device comprising:
a conduit including an inlet to provide entry of untreated water and an outlet to provide exit of treated water;
a porous electrode housed in the conduit and disposed between the inlet and the outlet, the porous electrode including an electrically conductive mesh, nanostructures coupled to a surface of the electrically conductive mesh, and an insulating coating conformally disposed to cover an active surface of the electrically conductive mesh;
a counter electrode housed in the conduit and spaced apart from the porous electrode, wherein the counter electrode and the porous electrode are spaced apart by 1 to 100 µm;
an electrical source coupled to the porous electrode and the counter electrode to apply a voltage difference between the porous electrode and the counter electrode; and
a filtration unit downstream from the outlet of the conduit.

12. The water sterilization device of claim 11, wherein the insulating coating has a thickness in a range of 100 nm to 10 µm.

13. The water sterilization device of claim 11, wherein the porous electrode includes pores sized in a range of 5 µm to 400 µm.

14. The water sterilization device of claim 11, wherein the filtration unit is a reverse osmosis unit.

15. The water sterilization device of claim 11, wherein the insulating coating comprises one of a metal oxide, silicon oxide, a carbide, a boride, a nitride, or a silicide.

* * * * *